United States Patent
Beno et al.

(10) Patent No.: US 11,501,007 B2
(45) Date of Patent: *Nov. 15, 2022

(54) PERSONAL DATA ECOSYSTEMS

(71) Applicant: Accenture Global Solutions Limited, Dublin (IE)

(72) Inventors: Tal Beno, Thornhill (CA); Yuly Basovich, Maple (CA); Andrew Xia, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 133 days.

This patent is subject to a terminal disclaimer.

(21) Appl. No.: 17/095,667

(22) Filed: Nov. 11, 2020

(65) Prior Publication Data

US 2021/0064766 A1   Mar. 4, 2021

Related U.S. Application Data

(63) Continuation of application No. 16/909,910, filed on Jun. 23, 2020, now Pat. No. 10,860,731, which is a continuation-in-part of application No. 16/837,746, filed on Apr. 1, 2020.

(Continued)

(51) Int. Cl.
*G06F 21/60* (2013.01)
*G06F 21/62* (2013.01)

(Continued)

(52) U.S. Cl.
CPC ........ *G06F 21/604* (2013.01); *G06F 16/1837* (2019.01); *G06F 21/6227* (2013.01); *G06F 21/6263* (2013.01); *G06Q 20/363* (2013.01)

(58) Field of Classification Search
CPC .............. G06F 21/604; G06F 21/6227; G06F 21/6245; H04L 9/32; H04L 9/3247; H04L 63/126; G06Q 20/363
See application file for complete search history.

(56) References Cited

U.S. PATENT DOCUMENTS 10,291,395 B1 * 5/2019 Nenov ................ H04L 63/0428
10,380,685 B1 * 8/2019 Phillips ................ H04L 9/0637
(Continued)

FOREIGN PATENT DOCUMENTS

KR    20200020122 A    2/2020

OTHER PUBLICATIONS

Øines, S. et al., "Blockchain in government: Benefits and implications of distributed ledger technology for information sharing," Government Information Quarterly, 2017, Elsevier Inc., pp. 355-365.

(Continued)

*Primary Examiner* — Robert B Leung
(74) *Attorney, Agent, or Firm* — Norton Rose Fulbright US LLP

(57) ABSTRACT

Embodiments of the present disclosure leverage distributed ledger technologies to exert user-centric control over data shared with third party service providers. User access provider (UAP) devices manage user-configured permissions and metadata that control access to user data by the third party service providers. Permissions may enable service providers to access, write, and share user data with other service providers having appropriate permissions. Users may provide data to various service providers as they interact with services supported by the platform and as the data is received it may be validated and then stored on the distributed ledger. Data may be periodically synchronized across different service provider nodes responsible for maintaining the distributed ledger to ensure consistency with respect to each user's data. Additionally, users may revoke permissions, such as if the user stops using a service, and data associated with revoked permissions may be purged or deleted from the distributed ledger.

20 Claims, 9 Drawing Sheets

Related U.S. Application Data

(60) Provisional application No. 62/829,363, filed on Apr. 4, 2019.

(51) Int. Cl.
*G06Q 20/36* (2012.01)
*G06F 16/182* (2019.01)

(56) References Cited

U.S. PATENT DOCUMENTS

| | | |
|---|---|---|
| 10,417,219 B1 | 9/2019 | Yang et al. |
| 2017/0140375 A1 | 5/2017 | Kunstel |
| 2017/0300898 A1 | 10/2017 | Campero et al. |
| 2018/0032383 A1 | 2/2018 | Surcouf et al. |
| 2018/0082024 A1* | 3/2018 | Curbera ............ G16H 40/63 |
| 2018/0248880 A1 | 8/2018 | Sardesai et al. |
| 2018/0294966 A1 | 10/2018 | Hyun et al. |
| 2019/0028277 A1 | 1/2019 | Jayachandran et al. |
| 2019/0205563 A1* | 7/2019 | Gonzales, Jr. .......... G06F 21/10 |
| 2020/0160455 A1 | 5/2020 | Singh et al. |
| 2020/0195647 A1 | 6/2020 | Sun et al. |
| 2021/0135855 A1 | 5/2021 | Sunkavally |

OTHER PUBLICATIONS

Sunil Suseelan, Corda—A Blockchain Framework with No Chain of Blocks, Xoriant Blog, Oct. 9, 2019, Digital (https://www.xoriant.com/blog/digital/corda-blockchain-framework-no-chain-blocks.html), 9 pages, downloaded Mar. 20, 2020.

Corda Top Ten Facts #7: Both a blookchain and not a blockchain, Published Sep. 6, 2018, Digital (https://www.corda.net/blog/corda-top-ten-facts-7-both-a-blockchain-and-not-a-blockchain/), 3 pages, downloaded Mar. 20, 2020.

Corda Documentation, Key Concepts, Digital (https://docs.corda.net/docs/corda-os/4.4/key-concepts-transactions.html), Corda OS 4.4, 8 pages, downloaded Mar. 20, 2020.

Corda Documentation, States, Digital (https//docs.corda.net/docs/corda-os/4.4/key-concepts-states.html , Corda OS 4.4, 4 paes, downloaded Mar. 20, 2020.

HyperLedger Fabric, Ledger, Digital (https://hyperledger-fabric.readthedocs.io/en/release-1.4/ledger/ledger.html), 14 pages, downloaded Mar. 20, 2020.

Extended European Search report issued for European Patent Application No. 17386042.0, dated Jan. 17, 2018, 10 paes.

\* cited by examiner

PERSONAL DATA ECOSYSTEMS

CROSS-REFERENCE TO RELATED APPLICATIONS

The present application is a continuation of U.S. patent application Ser. No. 16/909,910 filed Jun. 23, 2020 and entitled "PERSONAL DATA ECOSYSTEMS," which is a continuation-in-part of U.S. patent application Ser. No. 16/837,746 filed Apr. 1, 2020 and entitled "PERSONAL DATA MANAGEMENT SYSTEM," which claims priority to U.S. Provisional Patent Application No. 62/829,363 filed Apr. 4, 2019 and entitled "SYSTEM AND METHOD FOR MANAGING PERSONAL DATA," the disclosures of which are incorporated by reference herein in their entirety.

TECHNICAL FIELD

The present application relates to distribute ledger technology (DLT) and more specifically to techniques for leveraging DLT to control and manage data distributed to different systems.

BACKGROUND

Technological advancements have had a dramatic impact on the world. One well recognized example of such advancements is the Internet. In its early days access to the Internet was primarily for academic and research purposes but has now become integrated into almost every aspect of daily life. For example, the Internet has become a primary medium through which people work, communicate, and provide and/or access services. Internet-based service companies (e.g., social media platforms, media streaming services, e-commerce providers, etc.) typically require users to provide personal information to a service provider (e.g., FACEBOOK®, INSTAGRAM®, NETFLIX®, AMAZON®, and the like). The personal information provided to such service providers may include a user's name, address, financial card or account information (e.g., credit card information, debit card information, bank account information, etc.), interests (e.g., hobbies, places the user likes to visit, contacts, etc.), and many other types of information. Some services may even monitor a user's activities so that recommendations and information responsive to the user's needs can be provided, such as Amazon's ALEXA®-enabled devices that use speech recognition technologies to provide information to users.

While such capabilities have enhanced and improved peoples' lives, there are some drawbacks. For example, when a user provides personal information to a company over the Internet it may become difficult for that person to manage or control how that company uses the information that the user provided or information about the user that the service provider has collected empirically (e.g., based on analysis of the user's activities and interactions with the service(s) that the service provider provides). Additionally, the services that a user utilizes may change over time such that a service the user once used has become irrelevant (e.g., in favor of another service or for some other reason) to the user. When this occurs, the user may or may not close their account but that does not necessarily mean that the information the user provided to the service provider can no longer be used by the service provider. Another problem is maintaining up-to-date information provided to each service provider. For example, if the user moves, the address information that a service provider has obtained may become incorrect unless the user updates their personal information to reflect their new address. However, it may be difficult for the user to individually update this information each time there is a change and in some cases, having outdated information with a service provider may prevent access to or otherwise impair the user's ability to use the service(s).

Existing service provider systems also do not provide tools or mechanisms that enable users to control their content and to limit how that information is used and maintained by service providers. To illustrate, many social media service providers provide public/private settings that allow users to control how their information is viewed and accessed by third parties and other social media users, but these setting impose few, if any, restrictions on how the social media provider uses the information. Often, social media and other service providers analyze text, image, and video content created by their users to derive information about their users' interests, shopping habits, travel and location-based information, or other characteristics, and such information is used to target advertising to the users or is sold to third parties for similar purposes. Another problem with existing social media and other service providers is the removal of content, such as if a user decides to leave a social media platform or stop using a service. Presently, when a user leaves a service provider they may close their account but the information the user has provided to the service provider may be retained (e.g., in case the user ever decides to return to the service provider, because the service provider deems the information to be the property of the service provider instead of the user, or for other reasons). Thus, a service provider may continue to share user information with third parties even when some of those users have stopped using the services of the service provider(s) (e.g., because users have no control or very little control over how service providers user their personal data).

SUMMARY

Embodiments of the present disclosure address these challenges and disclose a platform that provides tools and mechanisms to place users in control of their data and how it is distributed, shared, and accessed by various service providers. A user access provider (UAP) device is provided to manage sets of permissions and metadata that may be used to control how user data is accessed, shared, and utilized by service providers. The user may register with the UAP device and receive a platform identity (PID). As part of the registration process the user may receive a private key and a corresponding public key may be stored by the UAP device. Once registered with the UAP, the user may access services provided by one or more service providers. As part of the access of the services, the user may sign data provided to the services with the private key and the service providers may verify the user is the actual source of the data using the corresponding public key, either via interaction with the UAP device, or the public key may be provided to the service provider by the UAP device for data authentication purposes, as described in more detail below.

As data is received and verified by the service providers, service provider nodes may create transactions or records on a distributed ledger. Data recorded to the distributed ledger may be maintained on a per-user, per-data type basis such that each user's data is maintained separate from other users. Additionally, user data may be isolated on an ecosystem basis such that data exchanged with service providers within one service provider ecosystem is maintained separate from data exchanged with service providers in another service provider ecosystem (e.g., medical data may be stored in a portion of the distributed ledger allocated to medical service providers while social media data may be stored in a portion of the distributed ledger allocated to social media service providers). The service provider nodes may be configured to synchronize the data recorded to the distributed ledger in accordance with configured permissions to ensure the user's data is consistent across all service providers and ecosystems. Additionally, user devices may maintain a digital wallet and user data may be periodically backed up to the wallet(s) to provide the user(s) with visibility into their online or digital footprints. Moreover, users may revoke permissions from one or more service providers to prevent those service providers from further use or access of all or portions of the user's data. When permissions are revoked, the service provider nodes may delete or purge the user's data from the local instance of the distributed ledger, thereby ensuring that the service provider can no longer access the user's data (or a portion thereof). The above-described concepts are described and illustrated in more detail below.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
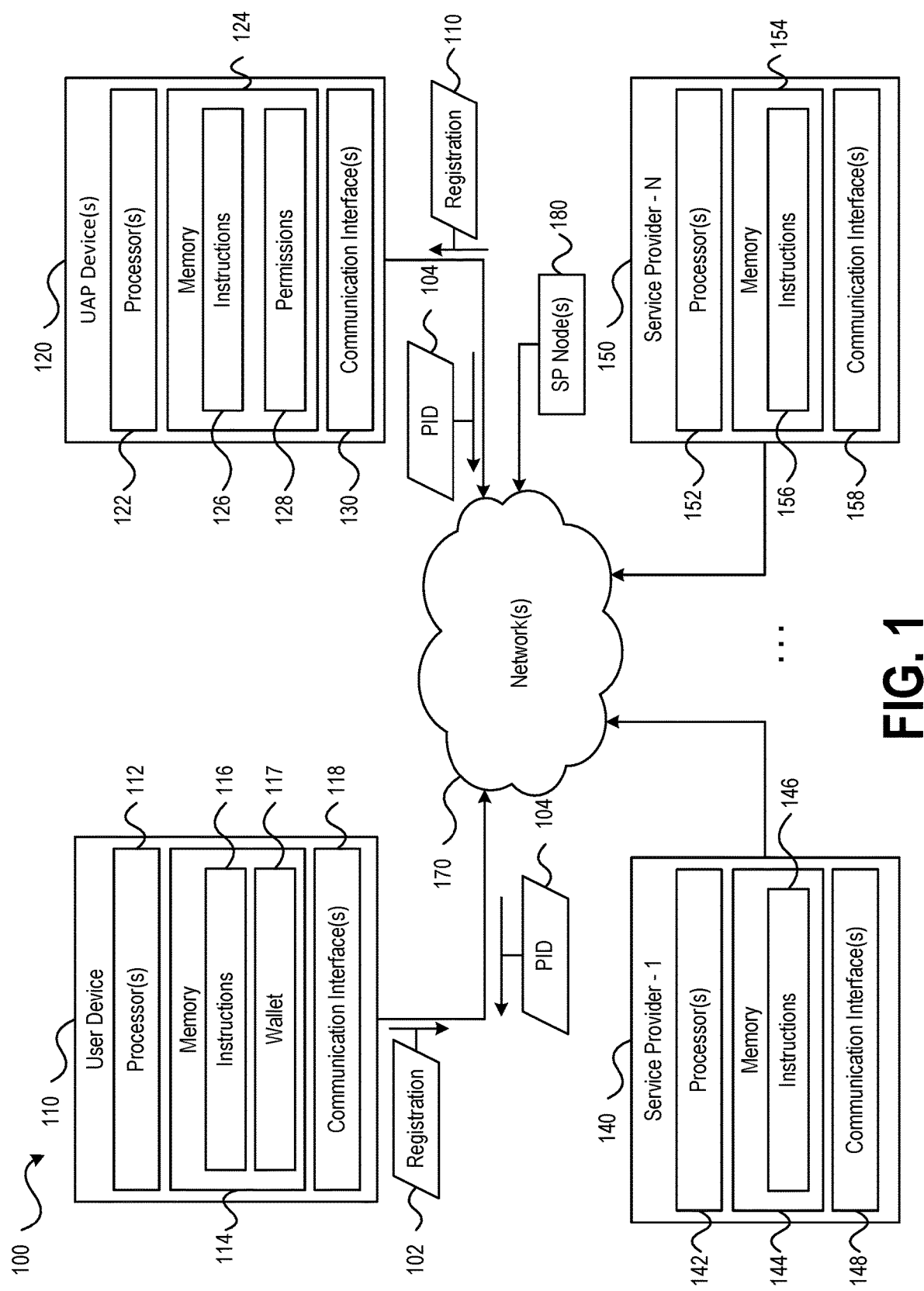
FIG. 1 is a block diagram of a platform for providing user-based control of data access in a multi-party environment according to embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure enable users to take control of their data by providing a platform that utilizes permissions to manage service provider access to user data. Service provider permissions may be managed by a UAP device (or devices) and allow service providers to receive/share/access user data or prevent service providers from receiving/sharing/accessing user data. For service providers with appropriate permissions, users may provide data during access of one or more services and the data may be recorded at a distributed ledger by service provider nodes. Each service provider node may correspond to a different service provider device (or service) and may only store information (e.g., user data, permission data, metadata, etc.) for which the corresponding service provider has appropriate permissions. To illustrate, a service provider that only has access permissions may store user data on the distributed ledger but may not share that data. In contrast, a service provider having both access and sharing permissions may store data and share the data with other service providers (having at least access permissions). The user may also revoke granted permissions, such as if the user stops using a particular service, and revoking the permissions may result in deletion or purging of at least a portion of the user's data from the distributed ledger maintained by the service provider corresponding to the service provider having the revoked permissions. As will be apparent from the more detailed description and examples below, embodiments of the present disclosure provide new functionality and features that improve the way that users interact with service provider systems to manage their online footprint and provide new capabilities that enable users to view and remove their data from service provider systems, a capability that is not readily available in present day systems. Moreover, aspects of the present disclosure improve data security by preventing misuse and misplacement of user data by entities. For example, the permission-based aspects of the present disclosure may preclude sharing of user data with entities that have not been granted access by the users, thereby placing users at the center of controlling distribution of data among service providers. Such capabilities represent a shift from existing systems where service providers control how user data is utilized and shared with users being provided with little or no control over such functionality.

Referring to FIG. 1, a block diagram of a platform for providing user-based control of data access in a multi-party environment according to embodiments of the present disclosure is shown as a platform 100. As shown in FIG. 1, the platform 100 includes one or more user devices 110, one or more user access provider nodes 120, a plurality of service provider (SP) devices, and a plurality of SP nodes 180. It is noted that while FIG. 1 shows the plurality of SP devices as including N SP devices, including SP device 140, . . . , SP device 150, it is to be understood that platforms in accordance with the present disclosure may incorporate more or fewer service providers (e.g., N≥1).

As illustrated in FIG. 1, the user device(s) 110, the one or more user access provider nodes 120, the plurality of SP devices, and the plurality of SP nodes 180 may be communicatively coupled to one or more networks 170 via one or more wired or wireless communication links. The one or more networks 170 may include local area networks (LANs), wide area networks (WANs), wireless LANs (WLANs), wireless WANs, metropolitan area networks (MANs), cellular data networks, cellular voice networks, the Internet, and the like. The communication links provided via the one or more networks may include wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ Generation (3G) communication standard, a $4^{th}$ Generation (4G)/long term evolution (LTE) communication standard, a $5^{th}$ Generation (5G) communication standard, and the like).

The user device(s) 110 include one or more processors 112, a memory 114, and one or more communication interfaces 118. Each of the one or more processors 112 may be a central processing unit (CPU) or other computing circuitry (e.g., a microcontroller, one or more application specific integrated circuits (ASICs), and the like) and may have one or more processing cores. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the one or more processors 112, cause the one or more processors 112 to perform the operations described in connection with the user device 110 with reference to FIGS. 1-9. In addition to storing the instructions 116, the memory 114 may also store a digital wallet 117. The digital wallet 117 may be configured to store information associated with a user corresponding to the user device 110, such as digital identity information, digital snapshots of personal data the user has provided to various service providers, and other information, as described in more detail below.

The one or more communication interfaces 118 may be configured to communicatively couple the user device 110 to one or more networks 170 via wired or wireless communication links according to one or more communication protocols or standards (e.g., the one or more communication standards described above with reference to the one or more networks 170). Although not shown in FIG. 1, the user device(s) 110 may include input/output (I/O) devices, which may include one or more display devices, a keyboard, a stylus, one or more touchscreens, a mouse, a trackpad, a camera, one or more speakers, haptic feedback devices, or other types of devices configured to present information to a user or provide information to external systems and devices, such as the plurality of SP devices.

The user device(s) 110 may include various interfaces and applications that enable the user to interact with external systems and devices (e.g., the plurality of SP devices), such as to provide inputs to and view data displayed at a website displayed in a Web browser or an application executing on the user device 110 (e.g., a mobile application, a desktop application, etc.). For example, the SP devices may be associated with social media service providers, financial service providers, medical care service providers, retailers (e.g., loyalty program applications, e-commerce services, etc.), communication service providers (e.g., e-mail service providers, voice communication service providers, messaging services, etc.), and the like. The website or application may enable the user to provide information to the various service providers, such as to create and manage the user's accounts, upload images to a social media profile, perform financial transactions, initiate communications with various contacts of the user, obtain medical services, or other types of operations and functionality. Exemplary aspects of managing such data in accordance with the present disclosure are described in more detail below.

The UAP device(s) 120 may include one or more processors 122, a memory 124, and one or more communication interfaces 130. Each of the one or more processors 122 may be a CPU or other computing circuitry (e.g., a microcontroller, one or more ASICs, and the like) and may have one or more processing cores. The memory 114 may include ROM devices, RAM devices, one or more HDDs, flash memory devices, solid state drives SSDs, other devices configured to store data in a persistent or non-persistent state, or a combination of different memory devices. The memory 124 may store instructions 126 that, when executed by the one or more processors 122, cause the one or more processors 122 to perform the operations described in connection with the UAP device(s) 120 with reference to FIGS. 1-9. In addition to storing the instructions 126, the memory 124 may also store permission data 128. The permission data 128 may include sets of permissions for different users of the platform 100 and may be used to control access to user data by the plurality of services providers. To illustrate, permission data associated with the user device 110 may specify permissions that provide or deny access to data associated with the user corresponding to the user device 110. When the permissions provide access to data, the access may be provided as read only access (e.g., the service provider can view data provided by the user that granted the service provider permission), write access, sharing controls (e.g., permissions specifying whether a service provider shares user data with other entities), publishing controls (e.g., publishing controls may allow data to be posted or otherwise made publicly available, which is different from sharing controls that allow data to be shared (privately) from one service provider to another), or other types of access. Additional exemplary aspects of using permission data to control sharing of data with and between service providers, as well as denying or revoking access to data are described in more detail below.

The one or more communication interfaces 130 may be configured to communicatively couple the UAP device(s) 120 to one or more networks 170 via wired or wireless communication links according to one or more communication protocols or standards (e.g., the one or more communication standards described above with reference to the one or more networks 170). Although not shown in FIG. 1, the UAP device(s) 120 may include I/O devices, which may include one or more display devices, a keyboard, a stylus, one or more touchscreens, a mouse, a trackpad, a camera, one or more speakers, haptic feedback devices, or other types of devices configured to present information to and receive information from an administrator or other user supporting operations the UAP device(s) 120.

The SP device 140 may include one or more processors 142, a memory 144, and one or more communication interfaces 148. Each of the one or more processors 142 may be a CPU or other computing circuitry (e.g., a microcontroller, one or more ASICs, and the like) and may have one or more processing cores. The memory 144 may include ROM devices, RAM devices, one or more HDDs, flash memory devices, SSDs, other devices configured to store data in a persistent or non-persistent state, or a combination of different memory devices. The memory 144 may store instructions 146 that, when executed by the one or more processors 142, cause the one or more processors 142 to perform the operations described in connection with the service provider devices with reference to FIGS. 1-9.

The one or more communication interfaces 148 may be configured to communicatively couple the SP device 140 to one or more networks 170 via wired or wireless communication links according to one or more communication protocols or standards (e.g., the one or more communication standards described above with reference to the one or more networks 170). Although not shown in FIG. 1, the SP device 140 may include I/O devices, which may include one or more display devices, a keyboard, a stylus, one or more touchscreens, a mouse, a trackpad, a camera, one or more speakers, haptic feedback devices, or other types of devices configured to present information to and receive information from an administrator or other user supporting operations of the SP device 140.

The SP device 150 may include one or more processors 152, a memory 154, and one or more communication interfaces 158. Each of the one or more processors 152 may be a CPU or other computing circuitry (e.g., a microcontroller, one or more ASICs, and the like) and may have one or more processing cores. The memory 154 may include ROM devices, RAM devices, one or more HDDs, flash memory devices, SSDs, other devices configured to store data in a persistent or non-persistent state, or a combination of different memory devices. The memory 154 may store instructions 156 that, when executed by the one or more processors 152, cause the one or more processors 152 to perform the operations described in connection with the service provider devices with reference to FIGS. 1-9.

The one or more communication interfaces 158 may be configured to communicatively couple the SP device 150 to one or more networks 170 via wired or wireless communication links according to one or more communication protocols or standards (e.g., the one or more communication standards described above with reference to the one or more networks 170). Although not shown in FIG. 1, the SP device 150 may include I/O devices, which may include one or more display devices, a keyboard, a stylus, one or more touchscreens, a mouse, a trackpad, a camera, one or more speakers, haptic feedback devices, or other types of devices configured to present information to and receive information from an administrator or other user supporting operations of the SP device 150.

In aspects of the present disclosure, users may utilize their user devices to register with the UAP device 120. For example, the UAP device 120 may provide an application (e.g., a mobile application, a desktop application, a browser-based application, etc.) that may be accessed by the user device 110. The application may be configured to facilitate a registration process through which the user may obtain a PID.

During the registration process the user device 110 may transmit a registration request 102 to the UAP device 120 via the application. The registration request 102 may include the user's name, a device identifier (e.g., a media access control (MAC) address, a serial number, or other identifier that may be used to identify the user device 110), a username, a secret or password, an e-mail address, a telephone number, or other information depending on the particular configuration of the UAP device 120. It is noted that the specific types of information described as being included in the registration request 102 above have been provided for purposes of illustration, rather than by way of limitation and the registration request may be configured to include additional and/or different types of information depending on the particular use case to which the system 100 is applied and the type of service providers involved. For example, if a governmental organization or entity is involved, information used to register a user may include the user's social security number or other type of government assigned identifier that may uniquely identify the user to the government organization or entity. Comparatively, for a use case involving a social media service provider, utilizing a social security number would be an inappropriate piece of information for required to identify the user during registration. As such, it is to be understood that the registration requests of embodiments may utilize different types of information configured to uniquely identify a user and that the particular pieces of information included in a registration request may vary depending on the service provider(s) involved, the types of services the service provider(s) provides, or for other reasons.

Upon receiving the registration request 102, the UAP device 120 may verify the content of the registration request 102 and upon successful verification, may transmit a platform identity (PID) message 104. In an aspect, the verification of the contents of the registration request 102 may include transmission of a verification to the user device 110, such as an e-mail message, a text message, an automated voice response message, or other communication configured to be received by the user. The verification transmitted to the user device 110 may include a code (e.g., a sequence of alphabetic, numeric, or alphanumeric characters) that the user may input (e.g., using the I/O devices of the user device 110) to the application associated with the UAP device 120 to verify the contents of the registration request 102. It is noted that other techniques may be used to verify the user's identity based on the registration request, such as based on an image of the user's driver's license or other types of identification techniques and that the examples described herein are provided for purposes of illustration, rather than by way of limitation. Following successful verification of the registration request 102, the UAP device 120 may transmit the PID message 104 to the user device 110 to indicate that the user has successfully registered with the UAP 120. Upon receiving the PID message 104 the application may generate a set of keys, which may include a public key and a private key. The private key may be stored locally to the user device 110, such as in the wallet 117. The public key may be transmitted to the UAP 120 and stored at the memory 124. For example, the public key may be stored as metadata within the permission database 128.

The platform 100 may utilize the PIDs to facilitate a variety of functions involving interactions between registered users (e.g., users that have completed the above-described registration process with the UAP device 120) and the plurality of service provider devices. The PIDs may be unique on a distributed ledger configured to support operations of the platform 100. For example, each of the plurality of service provider devices may be associated with one of the SP nodes 180 and the distributed ledger may be maintained on the SP nodes. In an aspect, the SP nodes 180 may be established when service providers register with the platform 100. In aspects, the functionality of the SP nodes 180 may be provided via software processes running on the respective service provider devices. In additional or alternative aspects, the SP nodes may be cloud-based processes running on behalf of different service providers or may be physical servers or other types of computing devices operating on or accessible to service provider networks.

Registration of the service providers and establishment of the SP nodes may be utilized by the platform 100 to ensure compliance with various aspects of the present disclosure. For example, as users provide data to the plurality of service provider devices the data may be recorded on a distributed ledger that is maintained by the SP nodes. The SP nodes may utilize an application programming interface (API) of the UAP device 120 to verify or attest to the data provided by user (e.g., to verify the identity of the user providing the data). As data is provided to one service provider and stored at the SP node 180 corresponding to the service provider, the data may be synchronized with other SP nodes corresponding to other service providers. The permissions configured by each of the users may control how the service providers access and use the data, as well as control the way in which data is synchronized between service providers (e.g., in response to new data being provided by a user, modifications being made to existing data, and the like). Additionally, permissions granted to one or more service providers may be revoked by the user. When permissions are revoked, the user's data may be removed from the distributed ledger maintained by the SP nodes 180. Further details regarding the above-described functionality and other operations that may be performed by the platform 100 are provided below.

Figure 2:
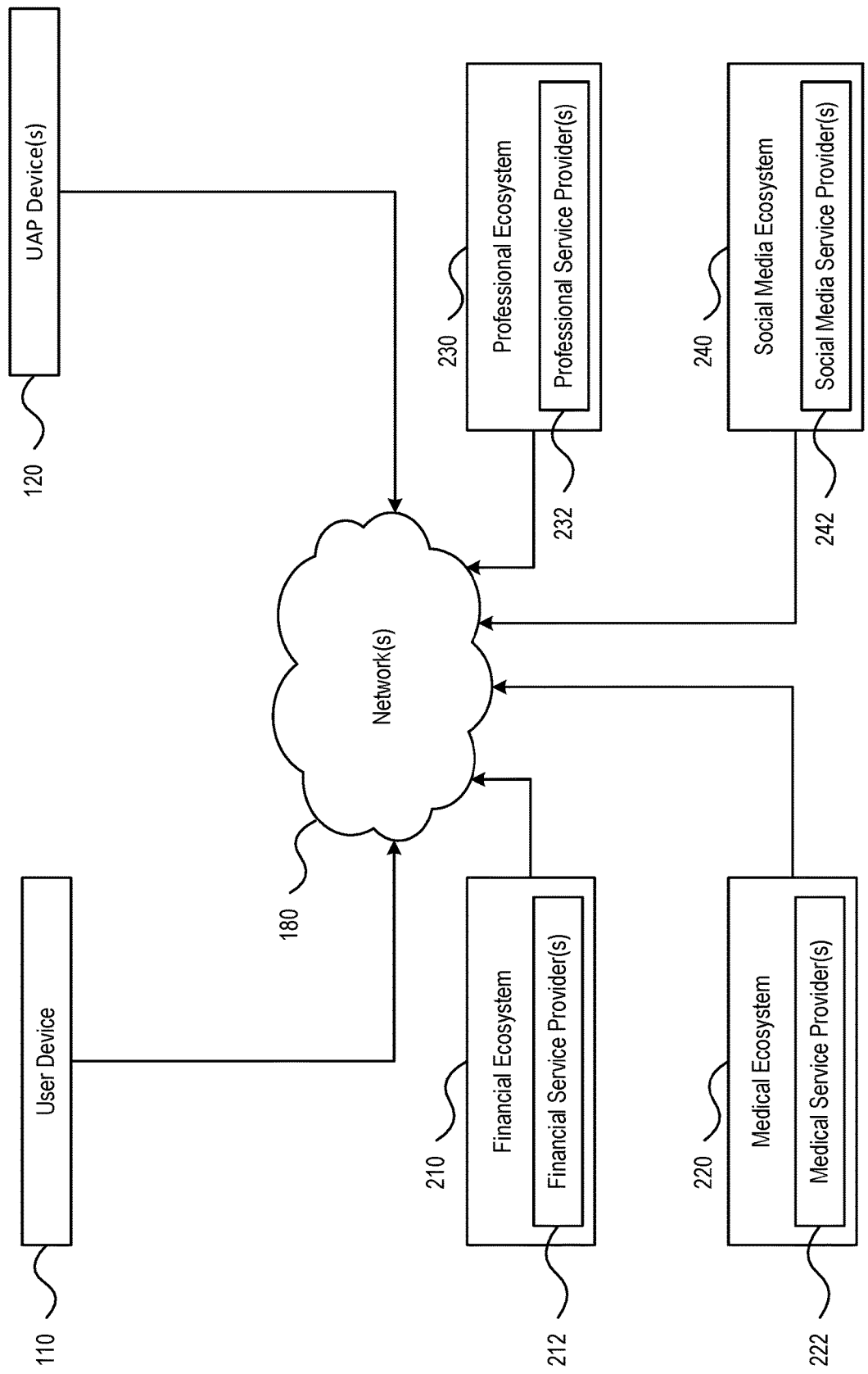
FIG. 2 is a block diagram illustrating aspects of data ecosystems according to embodiments of the present disclosure.

Referring briefly to FIG. 2, a block diagram illustrating aspects of data ecosystems according to embodiments of the present disclosure is shown. As shown in FIG. 2, the platform 100 may be configured to organize service providers into different ecosystems, illustrated in FIG. 2 as including a financial service provider ecosystem 210, a medical service provider ecosystem 220, a professional services ecosystem 230, and a social media service provider ecosystem 240. Each service provider ecosystem may include one or more service providers. For example, the financial service provider ecosystem 210 may include one or more financial service providers 212 (e.g., banks, credit card service providers, money transfer service providers, mortgage service providers, etc.), the medical service provider ecosystem 220 may include one or more medical service providers (e.g., clinics, hospitals, pharmacies, diagnostic services, etc.), the professional services provider ecosystem 230 may include one or more professional service providers 232 (e.g., entities providing services to their employees or third parties, such as SALESFORCE®, MICROSOFT®, APPLE®, etc.), and the social media service provider ecosystem 240 may include one or more social media service providers 242 (e.g., FACEBOOK®, TWITTER®, INSTAGRAM®, and the like).

It is noted that the exemplary service provider ecosystems illustrated in FIG. 2 are shown for purposes of illustration, rather than by way of limitation and the other service provider ecosystems may be utilized by platforms configured according to embodiments of the present disclosure. For example, service provider ecosystems may include government service ecosystems (e.g., public service or government service providers), utility and energy service provider ecosystems, communication service provider ecosystems (e.g., cellular communication service providers, e-mail service providers, etc.), media service provider ecosystems (e.g., entities offering streaming video services, movie studios, etc.), education service provider ecosystems (e.g., elementary schools, junior high schools, high schools, colleges, etc.), travel service provider ecosystems (e.g., airline service providers, railway service providers, subway service providers, taxi or ride share service providers, etc.), physical item service provider ecosystems (e.g., storage service providers, auction service providers, shipping service providers, etc.), or other service provider ecosystems. While many different types of ecosystems may be supported by the infrastructure and operations of the system 100, different ecosystem may be subject to the same or different rules that govern how the entities within those ecosystems operate and interact with users and their data. For example, ecosystems involving government entities may require more sensitive data (e.g., social security numbers, driver's license numbers, etc.) at registration and may require non-anonymized user accounts while consumer ecosystems (e.g., social media or commerce ecosystems) may allow anonymous user accounts and may require less sensitive information be provided by users.

Each of the different service provider ecosystems may interact with users (e.g., operators of the user devices 110) in different ways and based different types of information. For example, users may provide location information, contact information, image content, video content, and other types of information to service providers within the social media service provider ecosystem 240 and may provide medical history information, illness or symptom information, medication information (e.g., information about medications the user(s) is currently taking or has previously taken), or other types of information to that medical ecosystem 220 that are not typically provided to social media service providers. Additionally, the ways in which service providers within different service provider ecosystems utilize the information provided by users can vary depending on the types of services associated with each ecosystem. For example, information provided by users to service providers in the medical service provider ecosystem may be used to diagnose and treat illnesses, injuries, or other medical issues that the user is experiencing while information provided by users to service providers information in the social media service provider ecosystem may be used to derive information about the user and the user's behavior and then use the derived information to generate revenue (e.g., through targeted advertisements or other forms of monetization of user information).

Referring back to FIG. 1, the platform 100 may be configured to utilize different types of data. For example, the data types utilized by the platform 100 may include metadata, user information, permissions, and personal information. The metadata data type may include user PIDs and information associated with the PIDs of the users, such as a public key generated for each user during registration with the UAPs. The public keys may be stored by the UAP device 120, such as at the memory 124, and may be used to authenticate information provided to the service providers. To illustrate, a signature generated based on the user's private key may be included with information provided to the plurality of service providers and the service provider receiving the information may verify that the information actually came from the user by requesting verification of the signature with the UAP device 120. The UAP device 120 may receive the request to verify the signature and may utilize the public key associated with the PID of the user alleged to be providing the information to the service provider to verify that the information is actually coming from the user. Additional details regarding verification of data based on public keys and signatures is described in more detail below.

The permission data type corresponds to information that grants various rights to authorize the service providers with respect to user data. Permissions data may be maintained and stored at the UAP device 120 (e.g., as the permissions data 128). It is noted that the users may grant access to data using permissions on a data type basis, an ecosystem basis, a service provider basis, and the like. In addition to granting access to data by the service providers, the permissions data may also be used to revoke access to data. For example, a user may grant a particular service provider access to data for a period of time and then subsequently stop using the services offered by the particular service provider. When the user stops using the service, the user may revoke the particular service provider's permission to access the user's data, thereby preventing further use of the data by the particular service provider. In embodiments, the SP nodes 180 may be configured to delete user data from SP nodes associated with service providers having permissions that revoke or deny access to user data. The personal information data type may correspond to data that users provide to the service providers. Information of the personal information data type may be stored on a distributed ledger by the service providers, such as at the SP nodes 180. It is noted that the information associated with the personal information data type may include personally identifiable information (PII) (e.g., information that may be used to identify a specific user or that may be subject to General Data Protection Regulation (GDPR) requirements).

The user information data type may correspond to data that is provided to the service providers by the user during interaction between the user and the plurality of service providers. Depending on the permissions configured by the user for a particular service provider, the service provider may store the information in a corresponding SP node, utilize the information in a one-time use scenario (e.g., to perform a financial transaction; to authenticate a user accessing a service, such as using a GMAIL®, PAYPAL®, or FACEBOOK® login to access a service; etc.), or other types of operations. The plurality of SP nodes 180 may create data structures (e.g., hierarchical data structures) for storing information provided by each user. For example, the data structure may be a tree and different tree data structure may be created for each user to store information provided by the user. It is noted that although a tree data structure is described above, the tree data structure is provided for purposes of illustration, rather than by way of limitation and embodiments may utilize other data structures in accordance with the concepts disclosed herein. The creation of a separate data structure for each user ensures that each user's data is maintained separate from other data provided by users, which may enable the data to be more readily managed on a per user basis. For example, when a user revokes access to the user's data or a portion of the data (e.g., using the permissions data 128), the SP node of the service provider associated with the revoked access permissions may purge or delete the data structure.

Figure 3:
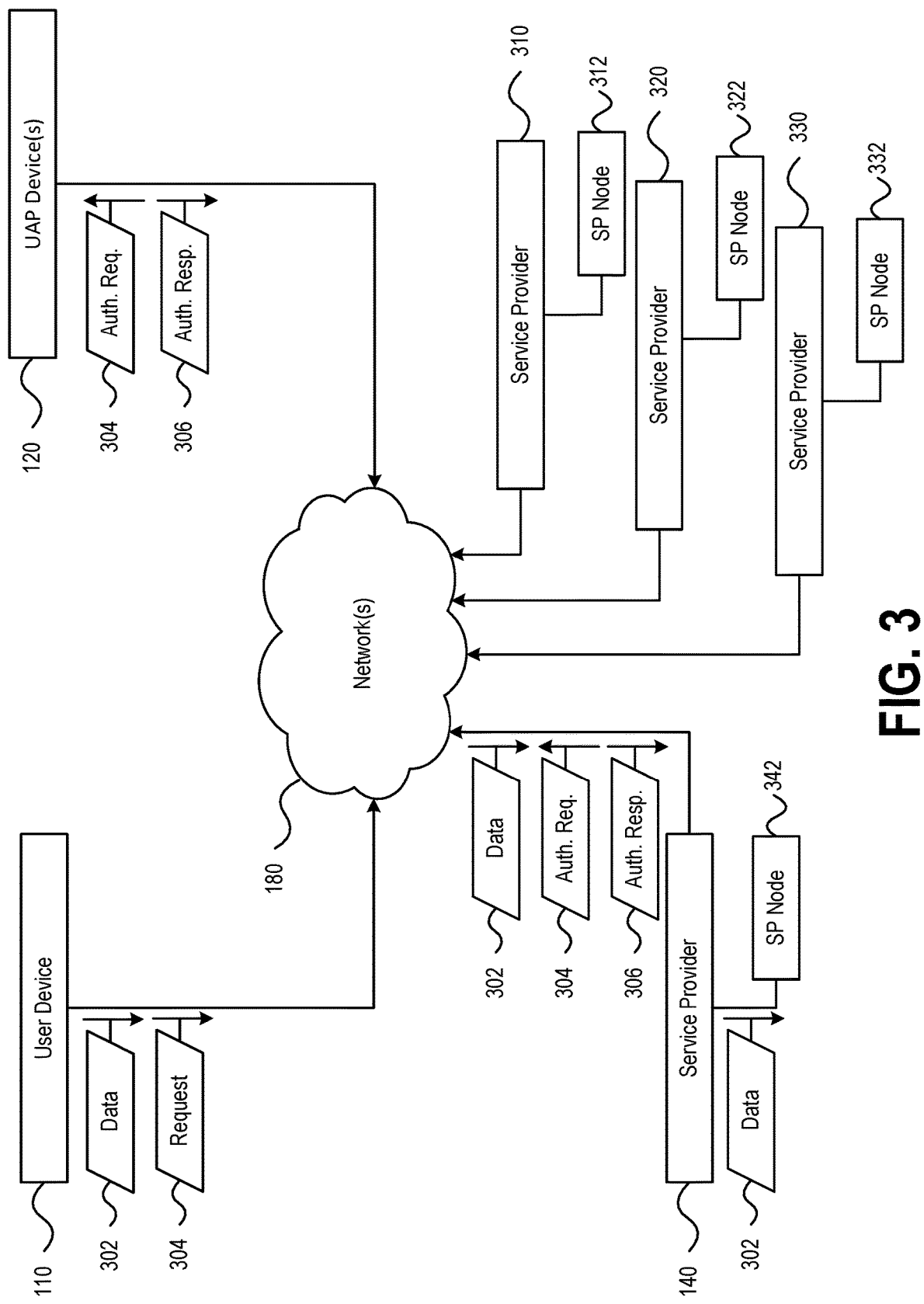
FIG. 3 is a block diagram illustrating an exemplary process for recording and managing access to data according to aspects of the present disclosure.

The above-described process of providing, authenticating, and storing user information at SP nodes is illustrated in FIG. 3, which is a block diagram illustrating an exemplary process for recording and managing access to data according to aspects of the present disclosure. In FIG. 3, the user device 110, the UAP device 120, and the service provider device 140 of FIG. 1 are shown. Additionally, FIG. 3 illustrates service provider devices 310, 320, 330, and service provider nodes 312, 322, 332, 342. The service provider device 140 may correspond to the service provider node 342, the service provider device 310 may correspond to the service provider node 312, the service provider device 320 may correspond to the service provider node 322, and the service provider device 330 may correspond to the service provider node 332. In some embodiments, the service provider devices 140, 310, 320, 330 may be assigned or allocated to a same service provider ecosystem, such as a social media service provider ecosystem, a medical service provider ecosystem, a financial service provider ecosystem, and the like. In other embodiments, some of the service provider devices 140, 310, 320, 330 may be assigned or allocated to different service provider ecosystems, such as a financial service provider ecosystem and a medical service provider ecosystem. It is noted that the particular ecosystems referenced in connection with FIG. 3 are provided for purposes of illustration, rather than by way of limitation and that the description of FIG. 3 may be utilized with service provider devices associated with other service provider ecosystems or combinations of service provider ecosystems.

As illustrated in FIG. 3, the user device 110 may generate and transmit data 302 to the service provider device 140 via the one or more networks 180. As described above, the data 302 may include the PID associated with the operator of the user device 110 and a signature generated using a private key of the PID. Upon receiving the user information 302, the service provider device 140 may transmit an authentication request 304 to the UAP device 120 via the one or more networks 180. The authentication request 304 may include the signature and PID included in the data 302 and may request that the UAP device 120 authenticate the user's identity based on the signature and PID. It is noted that the PID may not include the user's actual name or other identification information and may simply be a digital identifier that enables the UAP device 120 to determine a public key that may be used to authenticate the signature (e.g., as described above, when the user's PID is created it may be associated with a public/private key pair and the UAP device 120 may store the public key while the user device 110 may store the private key).

The authentication request 304 may be received by the UAP device 120 and the public key associated with the PID may be retrieved (e.g., from the memory 124). The UAP device 120 may apply the public key to the signature to verify that the signature corresponds to the PID, such as to verify that the application of the public key to the signature produces a correct value or other data indicative of the signature having been generated using the private key corresponding to the PID. Based on the application of the public key to the signature, the UAP device 120 may generate an authentication response 306, which may be transmitted to the service provider device 140 via the one or more networks 180. The authorization response 306 may indicate whether the data 302 was actually provided by the user. For example, where application of the public key to the signature produces a first value, the data 302 may be verified to be from the user and where application of the public key to the signature produces a second value, the data 302 may be determined to be from a different user (e.g., the data 302 cannot be trusted).

The service provider device 140 may receive the authentication response 306 via the one or more networks 180 and selectively store the user information 302 at the service provider node 342 based on whether the authorization response 306 indicates the data 302 is verified to be from the user or not. For example, where the authorization response 306 indicates the author of the data 302 is the user corresponding to the PID, the data 302 may be stored at the service provider node 342 and where the authorization response 306 indicates the author of the data 302 is not the user corresponding to the PID, the data 302 may be not stored at the service provider node 342. When the authorization response 306 indicates the author of the data 302 is not the user corresponding to the PID, an error message may be transmitted to the user device 110 to indicate that there was a problem associated with the data 302 or some other indication that a problem occurred when providing the data 302 to the service provider device 140. It is noted that although FIG. 3 illustrates the service provider device 140 as transmitting an authorization request 304 to the UAP device 120 in order to perform validation of the user identity and verify the source of data using the authorization response message 306, in some aspects the service provider may perform validation operations autonomously based on information (e.g., the user's public key) received from the UAP device 120, as described in more detail below with reference to FIG. 7.

Referring back to FIG. 1, information (e.g., the data 302 of FIG. 3) may be periodically synchronized across the service provider nodes to ensure that the distributed ledger maintained by the service provider nodes contains consistent information. Synchronization of data across the distributed ledger may be controlled via a set of policies. The set of policies used to control synchronization and sharing of user data across the distributed ledger may be configured based on the permissions specified by the user for controlling the types of access each service provider has. The types of access may include read-only access, denied or no access, sharing access, publishing access, open access, write access, or other types of access depending on the particular configuration of the platform 100.

Open access permissions or open ecosystems may be utilized for use-cases where more flexibility may be desired. For example, open access permissions or ecosystems may enable users to register with a service provider anonymously (i.e., without providing their actual name or other personally identifiable information) or allow a single user to have multiple accounts with a service provider. Open access permissions or ecosystems may be utilized for use-cases where the service providers and their services are not covered by government regulation and/or where there is minimal or no risk that the ability to have anonymous identities will enable the users to use the services in a malicious manner, such as to commit fraud.

The read-only access type may allow service providers to read the user's data from the distributed ledger but not perform other operations with the data, such as storing the data, using the data to profile the user, selling the data to third parties, etc. The denied access type may prevent a service provider from reading, receiving (e.g., during synchronization operations), or accessing data stored on the distributed ledger maintained by the service provider nodes 180. Service providers having write access permissions may update or change the user data recorded on the distributed ledger.

The sharing access type may enable service providers to provide or share user data with other servicers providers having appropriate permission levels. For example, the sharing access type may permit a first service provider to share user information with other service providers having read-only access, sharing access, or open access, but not with service providers having the denied access permission. The sharing permissions may be specified on a per service provider basis, an ecosystem basis, a data type basis, or based on other factors.

When sharing permissions are specified on a per service provider basis the user data may be shared only with service provider approved or specified by the user. For example, the UAP device 120 may be configured to provide a graphical user interface that includes interactive elements that enable a user to authorize a first service provider to share information with one or more additional service providers but may not share the user data with other service providers. When so configured, the first service provider may share user information with the one or more additional service providers but may not share the user information with any other service providers. It is noted that such capabilities may enable the user to authorize a first service provider to share information with a second service provider but prevent the second service provider from sharing information with the first service provider. For example, the user may authorize a service provider providing online retail services to share information with a second service provider providing financial transaction processing services, such as the user's bank or financial institution where the user maintains one or more financial accounts, but may prevent the second service provider from sharing user information (e.g., bank or financial account information) with the first service provider (e.g., the online retailer). It is noted that in this example the second service provider may be authorized to provide some information, such as an authorization to charge an amount to a financial card or account of the user, to the first service provider but may not share the user's personal information related to the user's financial accounts, such as balances, account numbers, and the like, which may be stored at a service provider node corresponding to the second service provider.

Configuring sharing permissions on an ecosystem basis may enable the user to quickly authorize or deny sharing of information between different service provider ecosystems. For example, the user may be able to configure sharing permissions that permit sharing of user information between service providers assigned or allocated to a medical service provider ecosystem using a single permission, thereby enabling the service provider that provides medical services to the user to share information. Such capabilities may enable the user to rapidly configure permissions for many different service providers within an ecosystem. In addition to configuring permissions for sharing information within a single ecosystem, the permissions may also specify sharing capabilities for sharing information between different ecosystems. For example, the graphical user interface provided by the UAP device 120 for configuring permissions may include interactive elements (e.g., checkboxes, radio buttons, dropdown menus, etc.) that enable the user to configure permissions for sharing information between different service provider ecosystems, such as to specify that service providers within a medical service provider ecosystem and within a retail service provider ecosystem may share information with service providers within a financial service provider ecosystem. Additionally, configuring permissions on an ecosystem basis may be used to deny sharing of user information within an ecosystem or between ecosystems. For example, the permissions may enable the user to specify that service providers within a social media service provider ecosystem may not share information with other service provider ecosystems and/or with other service providers within the social media service provider ecosystem.

Configuring permissions on a data type basis may enable sharing permissions to be specified for different types of data. For example, the user may configure permissions for personal information (e.g., address, legal name, telephone number, e-mail address, etc.), financial information (e.g., bank account, financial card information, etc.), social media content (e.g., image content, video content, text content, contacts or friends information, etc.), or other types of information. For example, the user may configure permissions that permit service providers to share financial information, such as to enable retail service providers to share financial information provided by users (e.g., to facilitate payment for purchases or other transactions) with other service providers (e.g., financial service providers providing services to process payments using the financial information). In aspects, the sharing permissions for data types may be more specific than just a category or type of data. For example, configuring sharing permissions for financial information may enable the user(s) to configure permissions for sharing a particular financial card or cards without enabling sharing of other types of financial information, such as financial account information. This may provide the user with the ability to enforce sharing permissions with a finer degree of specificity than simply sharing categorical data types.

It is noted that the various user-configured sharing permissions described above have been provided for purposes of illustration, rather than by way of limitation and that the platform 100 may enable additional sharing permissions to be configured. For example, the platform 100 may enable combinations of the above-described sharing permissions to be used, such as to configure sharing permissions on a per data type basis for a specific ecosystem or between specific ecosystems or other combinations of the above-describe sharing permissions and techniques. Additionally, a user may configure sharing and access permissions on the data instance level. For example, in a pharmaceutical use-case, users may configure permissions that dictate which pharmacies have access to each individual prescription. The ability to configure permissions on the data instance level, as opposed to the user, provides users with the ability to share information with service providers on a need-to-know basis, such that service providers only have access to portions of the user's information needed for each service provider to provide their services (e.g., a pharmacy filling a prescription for allergy medicine may not need access to the user's entire medical history).

In addition to user-configured sharing permissions, the platform 100 may be configured to impose some platform-level sharing permissions. For example, regulations such as General Data Protection Regulation (GDPR) and various national laws may restrict distribution of personally identifiable information (PII). The platform 100 may be configured to restrict the flow of PII data in accordance with such requirements. It is noted that while such restrictions may restrict the ability of platform 100 to synchronize data to each service provider node of the distributed ledger, other mechanisms may be provided by the platform 100 to ensure that data is handled in a consistent manner. For example, where PII data cannot be transmitted to a particular service provider node due to restrictions on distribution of PII data, a token or other type of information may be transmitted to the particular service provider node to indicate that updated information for a particular user has been received by other service provider nodes of the platform 100. Different tokens may be used to identify particular pieces of information, such as to indicate updated address information, updated financial account information, and the like. When the particular service provider device receives a communication or interaction with the user, the service provider node may prompt the user to provide updated information based on the token(s), thereby ensuring that the user's information is current across the distributed ledger.

In an aspect, the token(s) may be associated with a hash value or other information derived from the updated information, which may allow the particular service provider node to verify that the information the user provided corresponds to the updated information that resulted in transmission of the token. For example, where a token associated with an updated address is provided, a hash of the current address information may also be provided. It is noted that because the hash function would not include PII data, it may be able to be transmitted in accordance with GDPR regulations even though the actual address information would not be able to be transmitted. When the particular service provider device receives the updated address information (e.g., after prompting the user to provide such information), a hash function may be executed against the updated address information to verify the hash value received with the token and if a match occurs, the updated address information may be recorded to the particular service provider node and the distributed ledger may be synchronized without violating any GDPR regulations. Where the hash values do not match, the user may be prompted to confirm the address information and if confirmed, additional token data may be transmitted to other service provider nodes and devices to indicate that another updated address has been received and the process described above may be performed by the other service provider devices and nodes to obtain the updated information. The above-described techniques may facilitate sharing and synchronization of information (e.g., tokens, hash values, etc.) in compliance with GDPR regulations without requiring actual sharing of PII data. Regardless of the particular manner in which user data is synchronized by the platform 100, it is to be understood that synchronization of user data between SP nodes and the portions of the distributed ledger maintained by the SP nodes may be restricted based on permissions configured by the user. For example, each service provider receiving information via sharing must have been previously granted permissions to the shared data (e.g., to ensure the shared data is provided in compliance with the GDPR Privacy by Design provisions). Additionally, when a user revokes permission from a service provider, the service provider will no longer gain access to data about the user and information previously obtained from the user by the service provider may be deleted from the service provider ledger as described elsewhere herein, thereby ensuring compliance with GDPR's Right to be Forgotten provisions. As shown above, the platform 100 provides mechanisms that provide a structured and manageable way to ensure compliance with various GDPR provisions, including providing mechanisms for data sharing that are compliant with the Data Portability provisions.

Figure 4:
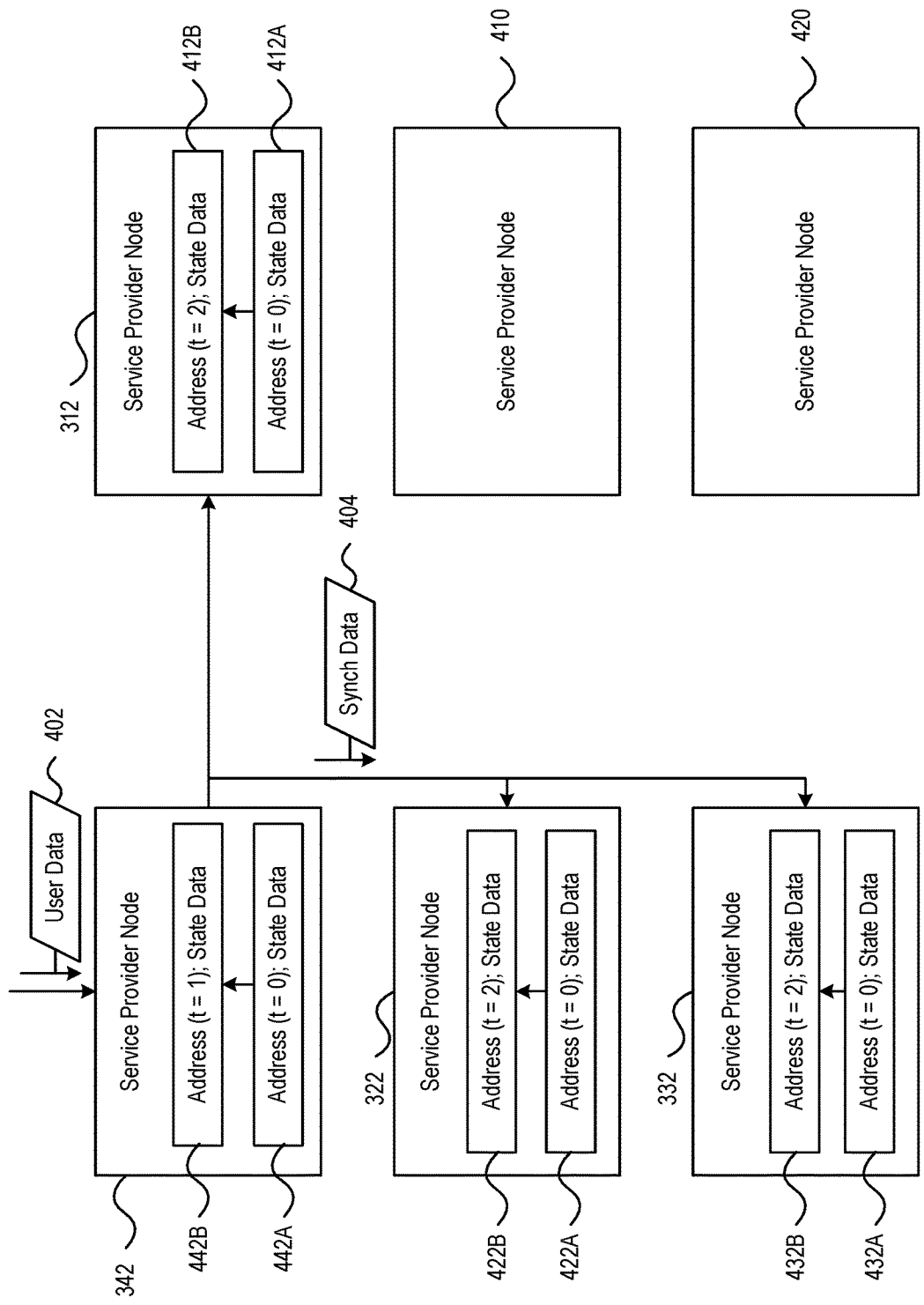
FIG. 4 is a block diagram illustrating processes for synchronizing data maintained on a distributed ledger in accordance with aspects of the present disclosure.

As briefly described above, as user data is provided from user devices (e.g., the user device 110) to service providers operating within different service provider ecosystems, the policies governed by the permissions configured by the user may be used to share and synchronize data across the distributed ledger maintained by the SP nodes 180. An exemplary process for synchronizing user information across a distributed ledger maintained by service provider nodes of the platform 100 in accordance with aspects of the present disclosure is shown in FIG. 4, which is a block diagram illustrating processes for synchronizing data maintained on a distributed ledger in accordance with aspects of the present disclosure. In FIG. 4, the service provider nodes 312, 322, 332, 342 of FIG. 3 and service provider nodes 410, 420 are shown.

As illustrated in FIG. 4, user data 402 may be received at the service provider node 342, which corresponds to the service provider device 140 of FIGS. 1 and 3. In an aspect, the user data 402 may be received at the service provider node 342 subsequent to the author of the user data 402 being authenticated, as described above with reference to FIG. 3. Upon receiving the user data 402, the service provider node 342 may access user data stored on the distributed ledger that corresponds to the author of the user data 402 to determine whether the user data 402 provides changes or updates to existing user data. To illustrate, suppose the user data 402 has address information. Upon receiving the user data 402, the service provider node 342 may compare the address information included in the user data 402 with address data 442A stored on the distributed ledger at a memory of the service provider node 342 (or the memory 144 of the service provider device 140). The address data 442A may have been received at a previous time (t=0) and the user data 402 may be received at a subsequent time (t=1). Upon comparing the address data 442A to the address information included in the user data 402, the service provider node 342 may determine that the address information included in the user data 402 includes updated or new address information and may store the updated or new address information as address data 442B.

A state may be associated with the data stored on the distributed ledger. For example, the address data 442A may include state data that indicates the address data 442 is current address data at time (t=0), but the state data associated with the address data 442 may be updated to indicate the address data 442A is historic data (e.g., not current, invalid, no longer to be used, etc.) at time (t=1) and the state data associated with the address data 442B may be assigned the current or valid information state. The state data may be used to indicate a freshness or validity status of information is recorded to the distributed ledger and the service provider device may be configured to utilize information associated with a current or valid state, rather than a historic state. Of course, if the address data included in the user data 402 had been the same as the address data 442A, no updates to the address data stored on the distributed ledger may be performed. Additionally or alternatively, data stored on the distributed ledger may be timestamped and a timestamp associated with the state data corresponding to the address data 442A may be updated to indicate the time when the user data 402 was received, which may signify that the address data 442A was still valid or current as of the timestamp.

Recording timestamps in connection with data recorded to the distributed ledger may help coordinate synchronization of data across the distributed ledger. For example, in high traffic scenarios where much information is being shared with the service provider devices and corresponding service provider nodes it is possible that updates to information recorded to the distributed ledger may occur frequently—however, synchronization may not be performed in real-time and so it is possible that one service provider node records first information to the distributed ledger as "current" information and another service provider node records second information (e.g., that is different from the first information) to the distributed ledger as "current" information, thus creating a scenario where two different pieces of information are recorded to the distributed ledger with the "current" or "valid" state. Such a scenario may occur where synchronization operations are performed periodically (rather than in real-time), such as once per day, week, hour, or some other period of time. The service provider nodes may synchronize the distributed ledger data using the timestamps so that consensus may be reached as to whether the "current" information should be the first information or the second information. To illustrate, where the first information has a most recent timestamp the distributed ledger may be synchronized based on the first information and where the second information has the most recent timestamp the distributed ledger may be synchronized based on the second information.

In some aspects, synchronization operations may synchronize both the current (or new) information and any intermediate information that may be relatively new (e.g., contains new information but not necessarily the most current information). To illustrate, supposed that in the example above both the first information and the second information are new to one of the service provider nodes but the second information is the most current or recently received information. The service provider node may synchronize its distributed ledger data based on both the first information and the second information (e.g., so the information recorded to the service provider node's distributed ledger information is complete), but may label the first information with the historic state and may label the second information with the current state. Synchronizing information known to be historic may ensure that all nodes have a complete record of the user information and maintain consensus among the service provider nodes storing that information on the distributed ledger.

As illustrated in FIG. 4, when the service provider node 342 records the address information 422B to the distributed ledger, the service provider node 342 may transmit synchronization data 404 to other nodes of the platform (e.g., the platform 100 of FIG. 1). For example, the service provider node 342 may transmit the synchronization data 404 to the service provider nodes 312, 322, 332 and may not transmit the synchronization data 404 to the service provider nodes 410, 420. The transmission of the synchronization data 404 to select service provider nodes may be based on sharing permissions configured by the user and/or based on sharing permissions configured by the platform 100, such as the sharing permissions described above for transmitting tokens (and potentially hash values, etc.) to comply with regulatory requirements, such as GDPR-related regulations. For example, as shown in FIG. 4, at time (t=0) the service providers nodes 312, 322, 332 may store address information 412A, 422A, 432A, respectively having the current label or status. The address information 412A, 422A, 432A corresponding to time (t=0) may be identical to (e.g., indicate the same address information as) the address information 442A.

At a time (t=2), which may correspond to a time when the service provider nodes 312, 322, 332 receive the synchronization data 404, the service provider nodes 312, 322, 332 may record the updated address information and update the status data associated with the address data 412A, 422A, 432A to indicate the historic state. For example, the service provider node 312 may record the updated address information as address information 412B having current or active state data and assign the historic state to the address information 412A; the service provider node 322 may record the updated address information as address information 422B having current or active state data and assign the historic state to the address information 422A; and service provider node 332 may record the updated address information as address information 432B having current or active state data and assign the historic state to the address information 432A.

The transmission of the synchronization data 404 to the service provider nodes 312, 322, 332 342 may be based upon sharing permissions configured on a per ecosystem basis. For example, each of the service provider nodes 312, 322, 332, 342 may be part of a same service provider ecosystem and the user's sharing permissions may be configured to permit sharing of user data between service provider nodes within the same ecosystem. It is noted that such sharing permissions may only apply to service provider that the user actually has a relationship with. For example, the service provider node 410 may be associated with a service provider that provides a service the user does not utilize and the synchronization data 404 may not be transmitted to the service provider node 410 even though the service provider node 410 may be associated with a same service provider ecosystem as the service provider nodes 312, 322, 332, 342. As another example, the synchronization data may be transmitted to the service provider nodes 312, 322, 332, 342 based upon sharing permissions configured on a per service provider basis. For example, the user may configure sharing permissions that enable the user data 402 to be shared between the service provider node 342 and the service provider nodes 312, 322, 332 but not the service provider nodes 410, 420. It is noted that the synchronization data 404 may be transmitted in accordance with other sharing permissions and techniques (e.g., the token/hash value technique, etc.) and that the exemplary scenarios described above have been provided for purposes of illustration, rather than by way of limitation. Thus, it is to be understood that any of the techniques described herein for controlling sharing of data within platforms configured in accordance with the present disclosure may be utilized to manage and control sharing and synchronization of data across nodes maintaining a distributed ledger supporting the platform(s).

Referring back to FIG. 1, as shown above, the platform 100 provides various mechanisms that enable users to take control of how information is shared and synchronized between service providers providing services that the user utilizes. In addition to providing mechanisms for controlling how data is shared and synchronized, the platform 100 may also enable users to exert control over the storage of information on the distributed ledger. For example, the platform 100 may provide a graphical user interface that enables the user to selectively purge data from the distributed ledger maintained by the plurality of service provider nodes 180. The ability to purge information may enable the user to remove user data from service provider nodes associated with service providers that provide services the user no longer desires to use. The purging of information from one or more service providers (or service provider nodes) may be accomplished by revoking permissions from the service provider(s).

Figure 5:
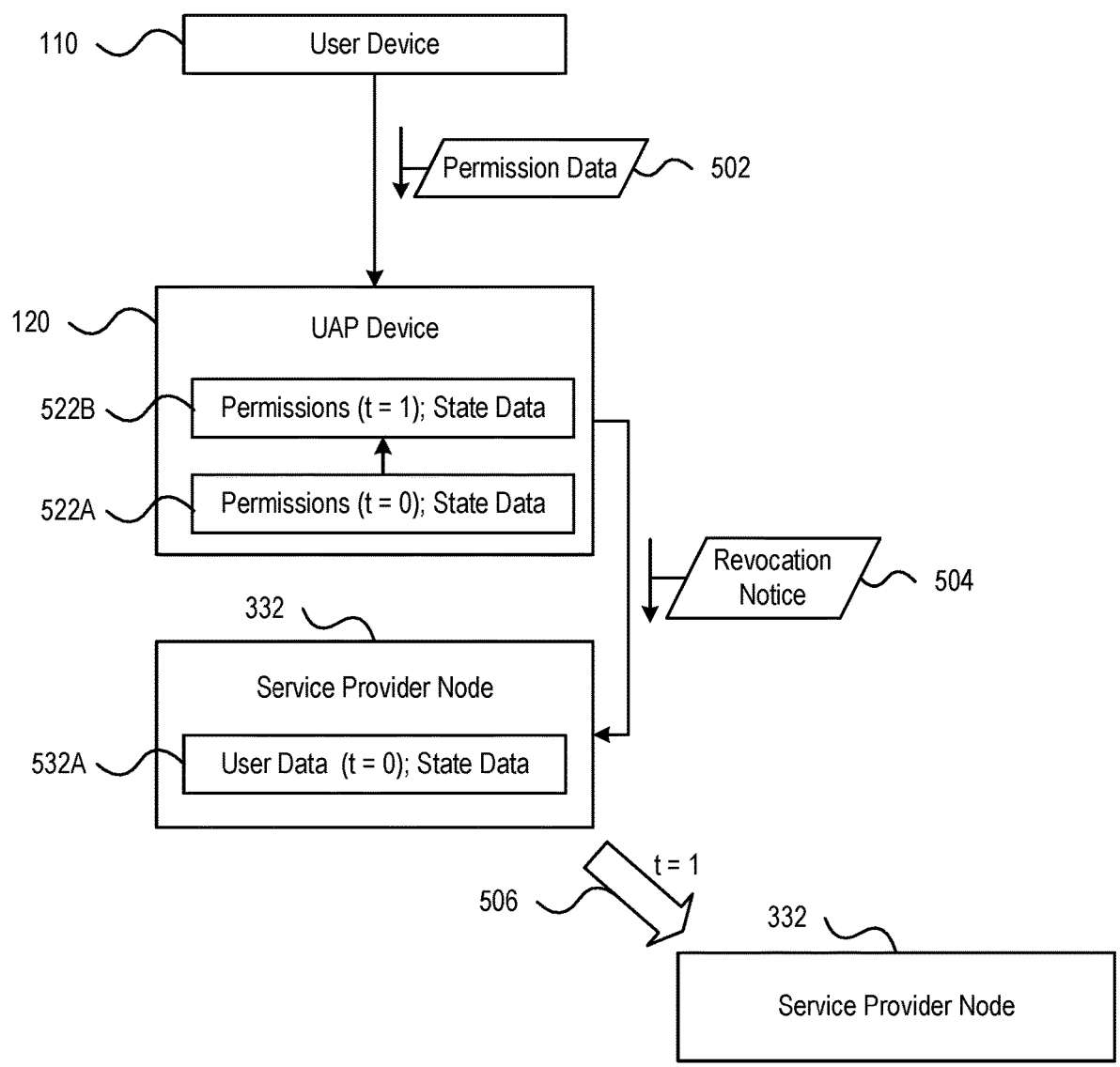
FIG. 5 is a block diagram illustrating aspects of purging information from a distributed ledger in accordance with aspects of the present disclosure.

For example and referring to FIG. 5, a block diagram illustrating aspects of purging information from a distributed ledger in accordance with aspects of the present disclosure is shown. In FIG. 5, the user device 110 and the UAP device 120 of FIG. 1 and the service provider node 332 are shown. As illustrated in FIG. 5, the user device 110 may provide permission data 502 to the UAP device 120. The permission data 502 may include an indication that permission to access user data by the service provider corresponding to the service provider node 332 has been revoked. Upon receiving the permission data 502, the UAP device 120 may update the permissions stored at the memory of the UAP device 120 (e.g., the permissions 128 stored at the memory 124). For example, permission data 522A for the user at a time (t=0) may authorize the service provider node 332 to access data of user. Thus, at time (t=0) the service provider node 332 may store user data 532A, which may include information previously provided to the service provider node 332 by the user and/or as a result of data synchronization operations (e.g., as described above with reference to FIG. 4).

At a time (t=1) the UAP device 120 may receive the permission data 502 indicating that access permissions have been revoked for the service provider (e.g., the service provider device 330 of FIG. 3) associated with the service provider node 332 and may update the permissions data of the user to reflect the revoked permissions, such as by storing updated permission data 522B. In an aspect, the permission data stored at the UAP device 120 may be associated with state data. For example, at time (t=0) the permission data 522A may have the current or active status but upon receiving the permission data 502, the permission data 522A may be assigned the historic state and the permission data 522B may be assigned the current or active status (e.g., at time (t=1)).

Upon updating the permission data for the user based on the permission data 502, the UAP device 120 may transmit a revocation notice 504 to the service provider node 332 (or the service provider device 330 of FIG. 3). The revocation notice 504 may indicate that the service provider's permission to access the user's data have been revoked and that the service provider is no longer authorized to access the user's data. Upon receiving the revocation notice 504, the service provider node 332 may purge or delete the user's data. For example, prior to reception of the permission data 502 by the UAP device 120 (e.g., at time (t=0)) the service provider node 332 may store user data 532A having the current or active state. When the revocation notice 504 is received, the service provider node 332 may delete the user data 532A, as indicated by arrow 506. Thus, at time (t=1) the service provider node 332 may not store any user data corresponding to the user associated with the user device 110. It is noted that purging or deleting of user data may include removal of any records of user transactions that the user may have engaged in with a service provider. It is noted that while the examples described above provide for complete deletion or purging of user data when permissions are revoked, in some aspects the purging of data may not result in a complete purge of all user data. For example, in some use-cases regulatory requirements or other factors may require that some data be retained (e.g., for a finance or healthcare use-case). In such instances the platform 100 may be configured to facilitate some data retention capabilities, such as to retain portions of the user's data required to comply with the appropriate regulatory requirements, and any retained data may be prohibited from being shared or may only be shared with service providers having higher-level permissions to access the retained data, such as a government-type service provider.

It is noted that although the example illustrated and described with reference to FIG. 5 involves deletion of all user data from the service provider node 332, embodiments of the present disclosure are not so limited. For example, a user may revoke permissions to access all data of the user, which may result in a purge or deletion of all user data as described above, or may revoke permission to access certain types or pieces of information, such as financial account information, address information, e-mail or telephone number information, video content, image content, or other information that the user may have provided to the service provider and that may be recorded to the distributed ledger by the service provider node 332. When access permissions for specific types or pieces of information are indicated (e.g., instead of all access permissions), the service provider node(s) may only delete or purge the specific types or pieces of user data for which permissions have been revoked instead of all user data.

The ability to delete or purge information from the distributed ledger using permissions highlights is an important difference between utilizing distributed ledger and blockchain technologies. For example, public blockchains are often touted as creating trustworthy systems due to the immutability of the records recorded to the blockchain. However, if data were removed from a blockchain this would degrade the trustworthiness of the system because deletion of blocks from the blockchain would create the appearance that the data has been tampered with and may prevent authentication of data that remains on the blockchain. As an example, data recorded to a blockchain often includes information, such as a hash value or other cryptographic information, derived from a previous block and that may be used to validate the authenticity of a block, such as by verifying that the hash value of cryptographic information stored in a block can be reproduced using the information recorded to the previous block. However, deletion of information from the previous block may prevent such validation techniques from being used, thereby creating a sense of mistrust within the system.

In contrast, the distributed ledger utilized by platforms according to embodiments of the present disclosure may be able to maintain consensus of user data despite user data being deleted from some service provider nodes. For example, the above-described synchronization techniques may ensure that all service provider nodes receive updated user data or at least notification that changes have occurred with user data (e.g., if GDPR regulations prevent transmission of the user data), thereby allowing all service provider nodes to track the current state of user data within the distributed ledger. Additionally, because data is maintained in a historical state (unless deleted or purged based on revoked permissions), changes to the user data may be tracked and identified, thereby allowing the service provider nodes to achieve consensus with respect to what the current user data actually is.

In an aspect, the platform 100 of embodiments may leverage private blockchain technology to facilitate a private ecosystem between service providers. In such instances, new service providers may only be added with the consent of the ecosystem, thereby ensuring that all service providers in a given ecosystem agree to comply with the ecosystem requirements (e.g., all service providers agree to follow the permission-based access scheme of the platform and purge data upon permission revocation). However, for some ecosystems may be open to any service providers.

In an aspect, smart contracts may be utilized by platforms of the present disclosure to provide validation and enforcement mechanisms or other functionality. For example, smart contracts may be utilized to enforce compliance with data access permissions, revocation and deletion of data, or other use-case specific functionality. Smart contracts may be provided on an ecosystem basis such that each ecosystem is associated with a smart contract to which all ecosystem members are a party. Using ecosystem specific smart contracts may enable permissions and data purging to be enforced in different ways to account for differences associated with the different ecosystems. For example, some ecosystems may be subject to regulatory requirements that require data to be retained for a certain period of time. In such instances, data may be retained by those service providers for the required period of time before being purged, but service providers in other ecosystems that do not have data retention requirements may be required by the smart contract to purge data immediately upon revocation of permissions.

In addition to the above-described features for configuring and controlling access of user data via permissions, the platform 100 may provide other functionalities. For example and referring back to FIG. 1, the user device 110 may maintain a wallet 117 in the memory 114. The wallet 117 may be configured to store a snapshot or snapshots of user data that the user has provided to the various service providers supported by the platform 100. For example, as user data is provided to the plurality of service providers that user data may be periodically stored as a snapshot at the user's wallet 117. The information stored in the wallet 117 may enable the user to determine what information the user has provided to various service providers and obtain a comprehensive view of the user's footprint on the distributed ledger maintained by the service provider nodes of the platform 100.

To illustrate, the user device 110 may include an application provided by an entity that operates the UAP device 120 and the application may be configured to present a graphical user interface to the user that allows the user to view service providers offering services that the user utilizes (e.g., has provided information to). The application may be a mobile application, a browser-based application (e.g., an application accessible over the Internet via a Web browser), or other type of application running on a smartphone, a tablet computing device, a desktop or laptop computing device, a personal digital assistant, or other type of electronic device adapted to perform the operations of the user device 110. The graphical user interface may enable the user to view the information that has been recorded to the distributed ledger and may arrange or present the information held in the wallet 117 in a variety of ways. For example, the graphical user interface may enable the user to view a listing of all of the service providers the user has utilized, review the information that is maintained on the distributed ledger by each service provider, review and modify the permissions that each service provider has within the platform 100, or other types of features. The information maintained on the distributed ledger may be arranged or presented in a variety of ways, such as to show current personal information (e.g., address, e-mail, telephone number, and other personal information of the user) maintained on the distributed ledger, which should be consistent across all service providers. Additionally, the user may be able to browse a list of transactions the user has participated in with the various service providers, which may include purchase or financial transactions, medical records, content viewed on streaming platforms, content uploaded to social media service providers, or other types of information.

Providing each user with the ability to view a snapshot of the data they have shared with service providers represents a significant departure from the technologies in existence today. For example, for a present day Internet user it may be difficult to remember every service provider that the use has engaged with over their lifetime, much less the content and data that they have shared with all of the service providers. This makes it almost impossible for users to manage their digital footprint and keep track of the information they have provided to service providers over time. In contrast, the above-described wallet enables snapshots of user data that is on a distributed ledger maintained by service provider nodes to be backup to local user devices (e.g., the user device 110) where the information may be viewed by the user, thereby enabling the user to view a current list of service providers and services that the user has used, as well as the data the user has provided to the service providers. Further, the data stored in the wallets enables users to actively manage permissions and verify that data has been purged by service providers for which the user has revoked access, such as by viewing the information maintained in the wallet on a per service provider basis after the purge to ensure that the user information is no longer stored on the service provider node.

Additionally, the snapshots stored in the wallet 117 may be used to periodically audit the user's information on the distributed ledger. For example, the wallet 117 may store current and historical user data that has been provided to service providers over time. Periodically the user device 110 may transmit an audit request to the service provider devices (or service provider nodes) requesting a snapshot or copy of all or a portion of the user's data and the user device 110 may compare the information received from the service provider devices/nodes (e.g., in response to the audit request) against previously obtained snapshots of the user's data (e.g., snapshots obtained via periodic backups of the user's data) to verify that the contents of the distributed ledger are correct. Such features provide the user with the ability to view, verify, and audit the user's online footprint and verify that none of the user's data has been altered or is incorrect.

Figure 6:
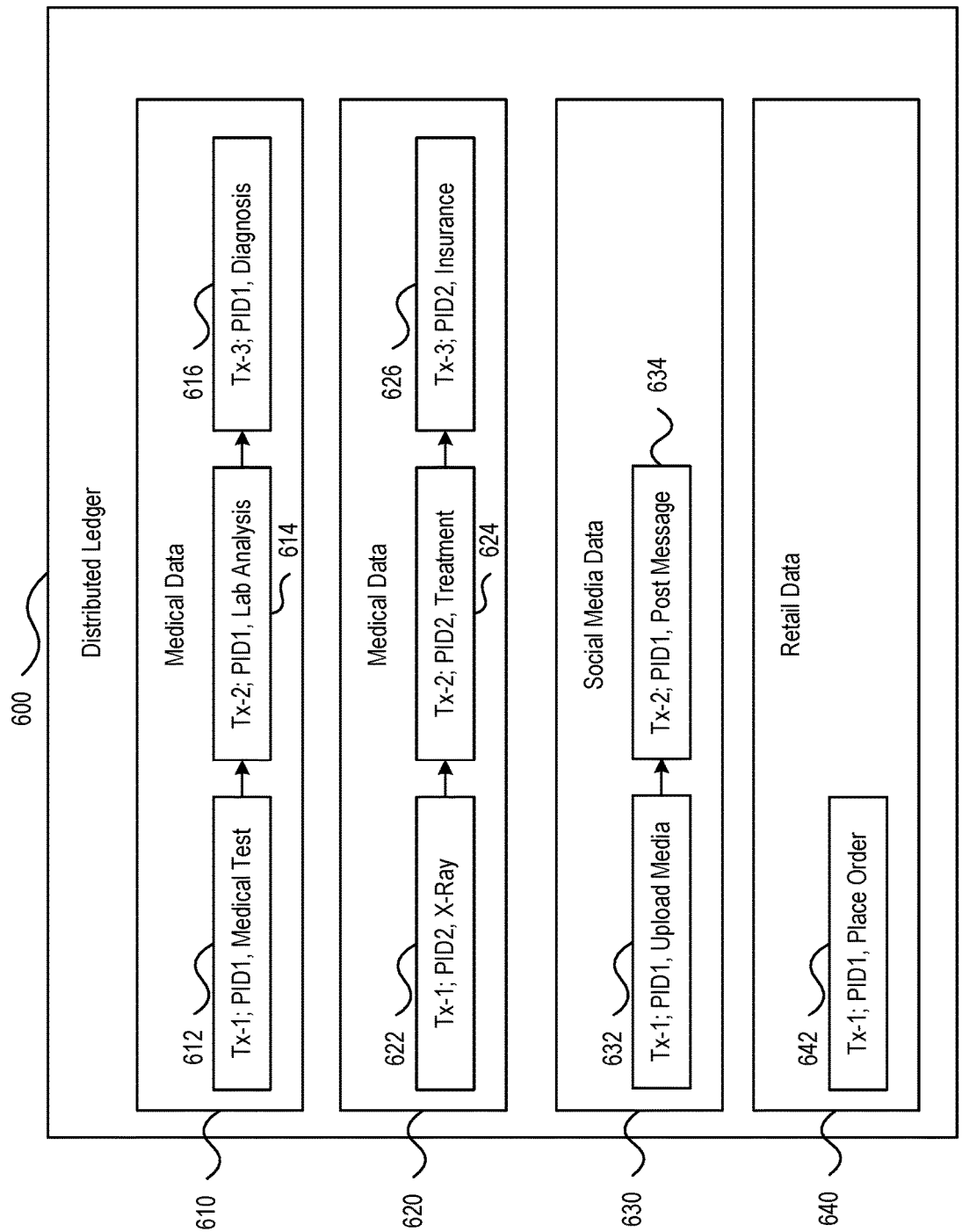
FIG. 6 is a block diagram illustrating aspects of a distributed ledger according to aspects of the present disclosure.

Referring briefly to FIG. 6, a block diagram illustrating aspects of a distributed ledger according to aspects of the present disclosure is shown. In FIG. 6, a distributed ledger 600 is shown and includes a plurality of transaction sequences. It is noted that a transaction sequence on the distributed ledger is not a financial transaction—instead transaction sequences refer to interactions between user and service providers (e.g., a user uploading media content to a social media service provider) or between service providers on behalf of or for the benefit of users (e.g., a doctor administering a test to a user patient and then a lab analyzing the test and providing the results back to the doctor) that result in data being recorded to the distributed ledger 600.

As shown in FIG. 6, data recorded to the distributed ledger 600 may be reflected as a separate transaction or transaction sequences per user/data-type. For example, in the ledger 600 illustrated in FIG. 6, transaction sequences 610, 620, 630, 640 are shown. The transaction sequence 610 includes data transactions corresponding to a first user (identified to the platform 100 using "PID1") and transactions 612, 614, 616 of the transaction sequence 610 include data transactions that record medical data of the first user to the distributed ledger 600. The transaction 612 may be a data transaction to record information associated with a medical test performed on the first user, the transaction 614 may be a data transaction to record information associated with lab analysis of the medical test (e.g., analysis of a swab of the first user's mouth, blood testing, etc.), and the transaction 616 may be a data transaction to record a diagnosis by a doctor of a condition of the first user, which may or may not be related to the medical test and lab analysis. The transactions included in the transaction sequence 610 may be performed by a single entity or by multiple entities. For example, the transactions 612, 616 may be performed by the first user's primary care physician and the lab analysis transaction 614 may be performed by a third party medical service provider, or the transactions may all be performed by a single medical service provider (e.g., a hospital with an onsite lab, etc.). The transaction sequence 610 includes medical data of the first user recorded to the distributed ledger 600 using the techniques described above (e.g., signature verification, permission-based access, and the like). It is noted that depending on the permissions of the various medical service providers supported by the platform 100, the medical data recorded to the transaction sequence 610 may or may not be readable to particular service providers supported by the platform 100 (e.g., some service providers may have permissions that permit read/view access to the medical data of the first user and other service providers may not). Additionally, it is noted that some service providers may be able to see some but not all of the transactions. For example, the lab service provider associated with the transaction 614 may be provided with access to the data recorded in the transaction 612, such as to share the test information (or sample) with the lab, but may not be able to read or access the transaction 616. In an aspect, when a transaction occurs (e.g., a transaction to update data, a transaction to create new data, etc.), signatures from the service provider and user may be recorded as part of the transaction. The sequence of transactions may be stored and distributed among the service providers alongside the current state of the data.

Similar to the transaction sequence 610, the transaction sequence 620 includes data transactions corresponding to a first user (identified to the platform 100 using "PID2") and transactions 622, 624, 626 of the transaction sequence 620 include data transactions that record medical data of the first user to the distributed ledger 600. The transaction 622 may be a data transaction to record information associated with an x-ray taken of the second user, the transaction 624 may be a data transaction to record information associated with treatment of the second user (e.g., information associated with placing a cast or other type fixation on the broken bone that was x-rayed, etc.), and the transaction 626 may be a data transaction to record insurance information (the second user's insurance provider information) on the ledger 600. The transactions included in the transaction sequence 620 may be performed by a single entity or by multiple entities. For example, the transactions 622, 624 may be performed by an emergency clinic that examines and treats the second user and the transaction 626 may be data recorded to the distributed ledger 600 by the second user (e.g., upon obtaining health insurance, upon a change in health insurance, and the like). The transaction sequence 620 includes medical data of the second user recorded to the distributed ledger 600 using the techniques described above (e.g., signature verification, permission-based access, and the like). It is noted that depending on the permissions of the various medical service providers supported by the platform 100, the medical data recorded to the transaction sequence 620 may or may not be readable to particular service providers supported by the platform 100 (e.g., some service providers may have permissions that permit read/view access to the medical data of the first user and other service providers may not). Additionally, it is noted that some service providers may be able to see some but not all of the transactions.

The transaction sequence 630 includes data transactions corresponding to the first user (identified to the platform 100 using "PID1") and transactions 632, 634 of the transaction sequence 630 include data transactions that record social media data of the first user to the distributed ledger 600. For example, the transaction 632 may be a data transaction to record media content that the first user uploaded to a social media service on the distributed ledger 600 and the transaction 634 may include text information the first user posted the social media service.

The transaction sequence 640 includes data corresponding to the first user (identified to the platform 100 using "PID1") and a transaction 642. Data recorded to the distributed ledger 600 in connection with the transaction sequence 640 may include data related to data transactions between the first user and retail service providers supported by the platform. For example, the transaction 632 may be a data transaction to record information associated with an order placed by the first user with a retail service provider, such as an order placed with an online shopping service.

It is noted that while FIG. 6 illustrates the distributed ledger 600 as including four transaction sequences (e.g., the transaction sequences 610, 620, 630, 640) corresponding to two different users (e.g., the first user associated with "PID1" and the second user associated with "PID2") and including three different types of data (e.g., medical data, social media data, and retail data), it is to be understood that the exemplary transaction sequences illustrated in FIG. 6 have been provided for purposes of illustration, rather than by way of limitation and the distributed ledgers according to embodiments may include more transaction sequences and include transaction sequences associated with other types of data (e.g., financial data, and the like). Additionally, while the transaction sequences 610, 620, 630, 640 are illustrated as including three or less data transactions, transaction sequences maintained on distributed ledgers according to the present disclosure may include more than three data transactions depending on the particular level of data transactions that users engage in with service providers supported by the platform.

As illustrated in FIG. 6 and described above, data is recorded to the distributed ledger 600 as separate transactions per user and per data type (e.g., the first user's medical data is recorded on the transaction sequence 610 while social media data and retail data of the first user are recorded on the transaction sequences 630, 640, and the second user's medical data (or other types of data) is recorded in transaction sequences that are separate from the transaction sequences associated with the first user). By maintaining transaction sequences on a per user/per data type basis, information may be purged from the distributed ledger 600 without creating the appearance of tampering. For example, suppose the first user revokes access to all or a portion of the user's social media data with a particular service provider. When this occurs, the transaction sequence 630 (or a portion) on the distributed ledger maintained by the service provider node of the particular service provider may be deleted (e.g., if the user revokes access to only images then images would be deleted, if the user revokes access to all data the entire transaction sequence maintained by the particular service provider node would be deleted). It is noted that if some of the data recorded to the social media transaction sequence 630 is associated with a different service provider (e.g., other than the particular service provider), the distributed ledger maintained on the service provider node of the different service provider may maintain its instance of the social media transaction sequence. Thus, for the particular service provider, the first user's social media data is completely deleted while other service providers maintaining social media data transaction sequences for the first user may not see any changes.

Additionally, it is noted the transaction sequences illustrated in FIG. 6 may not be completely visible to all service providers supported by the platform 100 of FIG. 1. For example, the medical data recorded to the transaction sequence 610 may be associated with two different medical service providers (e.g., a doctor and a lab) that provide medical service to the first user. The lab may have access to the medical test associated with the transaction 612 and the lab analysis data 614 but may not have access to the transaction data 616 that includes information related to the diagnosis by the doctor based on the lab analysis data 614. In contrast, the doctor may have access to all of the data recorded to the transaction sequence 610, including the lab analysis recorded in the transaction 614. Thus, the transaction sequence 610 may be completely recorded on the service provider node associated with the doctor while only a portion of the transaction sequence 610 (e.g., the transactions 612, 614) may be recorded at the portion of the distributed ledger maintained by the service provider node associated with the lab. Thus, each service provider node may record the same or different portions of the user's data on the distributed ledger depending on the access permissions that each service provider has been granted (e.g., service providers with the same permissions for a particular type of user data may have the same data recorded by their service provider nodes and service providers with different permissions for a particular type of user data may have the different portions of data recorded by their service provider nodes).

As briefly described above, distributed ledger data may be periodically backed up to user wallets, which allow users to obtain a complete picture of the data maintained on the distributed ledger by the service provider nodes. For example, the first user may be able to access the first user's wallet (e.g., the wallet 117 of FIG. 1) and view the transaction sequence 610, the transaction sequence 630, and the transaction sequence 640, but not the transaction sequence 620 associated with the second user.

It is noted that the transaction sequences may be structured as records in a database. For example, each data transaction sequence on the distributed ledger 600 may be correspond to a specific user and a single user may have multiple transaction sequence on the distributed ledger, such as different transaction sequences for different types of data and/or service provider ecosystems. Thus, instead of including a single data structure or table that records all user data for the users, the distributed ledger 600 may contain many individual transaction sequence records for each user, where each individual transaction sequence record corresponds to a data transaction sequence with respect to a particular user and type of data or ecosystem. In this manner, when a particular user's data is purged, the particular user's transaction sequence record for that data is simply deleted without impacting other transaction sequence records associated with data transaction sequences for other users and without causing any changes to other instances of the transaction sequence records of the distributed ledger storing data for the user.

Figure 7:
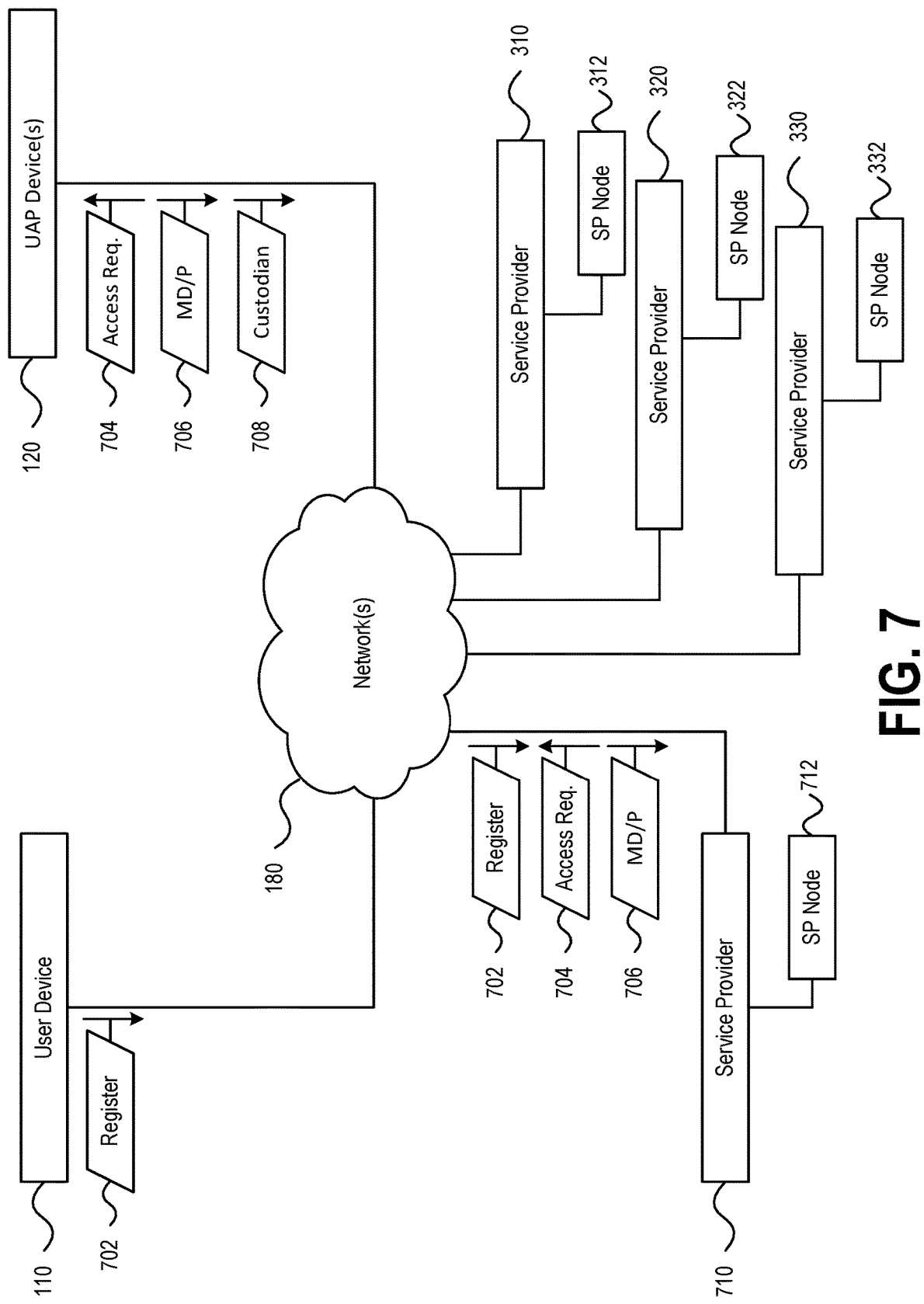
FIG. 7 is a block diagram illustrating aspects of a process for registering a user with a service provider in accordance with aspects of the present disclosure.

Referring to FIG. 7, a block diagram illustrating aspects of a process for registering a user with a service provider in accordance with aspects of the present disclosure is shown. In FIG. 7, the user device 110 and UAP device 120 of FIGS. 1 and 3 and the service providers 310, 320, 330 and the service provider nodes 312, 322, 332 of FIG. 3 are shown. Additionally, FIG. 7 illustrates a service provider device 710 and a service provider node 712 corresponding to the service provider device 710. In the example of FIG. 7, the user associated with the user device 110 is registering with the service provider device 710 as a new service provider for the user (e.g., the operator of the user device 110).

The registration process may be initiated when the user device 110 transmits a registration request 702 to the service provider device 710. In aspects, the registration request may be transmitted via an application communicatively coupling the user device 110 to the service provider device 710. For example, the application may be a mobile application that the user has installed on the user device 110 and may provide a graphical user interface that enables the user to sign up for one or more services provided by the service provider device 710. Additionally or alternatively, the application may be a web-based application accessible via a web browser of the user device 110, such as a website associated with the service provider corresponding to the service provider device 710. The application may request information from the user, such as the user's name, address, telephone number, e-mail address, or other information and the user may populate that information into the graphical user interface of the application (e.g., via a form or other input technique). When the registration request 702 is transmitted, it may include a signature of the user (e.g., a signature generated using the private key corresponding to the public key registered by the UAP device 120).

The registration request 702 may be received by the service provider device 710 via the network(s) 180 and upon receiving the registration request, the service provider device 710 may determine that the user is a new user and transmit an access request 704 to the UAP device 120. The access request 704 may be a request to receive permissions and other metadata from the UAP device 120, where the permissions and metadata may be used to control the service provider device's access to the user's data. In an aspect, the initial set of permissions granted to the service provider device 710 may be based on data type permissions and the user, once registered, may then customize the permissions for the service provider device 710. Alternatively or additionally, the UAP device 120 may transmit a notification or message to the user device 110 to configure the service provider permissions for the service provider device 710. In such an implementation the user may then access a permissions graphical user interface provided by the UAP device 120 to configure the permissions.

Regardless of whether the permissions and metadata are configured using default, per data type permissions, or custom permissions, the UAP device 120 may transmit the permissions and metadata to the service provider device 710 as a permissions and metadata message 706 (labeled "MD/P" in FIG. 7). The permissions and metadata message 706 may be received via the one or more networks 180 by the service provider device 710 and the granted permissions may be used to configure a portion of the distributed ledger maintained by the service provider node 712 to store data of the user based on the permissions (e.g., as the user begins exchanging data with the service provider device 710). In an aspect, the permissions and metadata message 706 may include a public key corresponding to the user's private key (e.g., the private key user to generate user signatures when providing data to service providers). The service provider device 710 may use the public key in subsequent interactions with the user to verify data provided by the user, such as to verify the identity of the user as being the source of data provided to the service provider device 710. In particular, rather than transmitting an authentication request (e.g., the authentication request 304 of FIG. 3) to the UAP device 120 and receiving an authentication response (e.g., the authentication response 306 of FIG. 3) from the UAP device 120, as described with reference to FIG. 3, the service provider device may verify the signature included in the data transmitted from the user device(s) using the corresponding public key, which may be stored by the service provider nodes as part of the distributed ledger. In such an implementation the public key may also be used by service provider devices and service provider nodes to validate data during synchronization operations, such as to validate that data being synchronized form one service provider node to other service provider nodes is authentic using the public key and the signature associated with the data being synchronized. Using the above-described techniques, service providers can ensure the transactions broadcasted to them as part of data synchronization are legitimate and that a user has approved the transaction by validating the signatures.

The permissions granted to the new service provider (e.g., the service provider associated with the service provider device 710) may be synchronized to portions of the distributed ledger maintained by one or more other service providers that also maintain distributed ledger data for the user. For example, suppose that the user utilizes services provided by the service providers corresponding to the service provider devices 310, 320 and that the service provider nodes 312, 322 maintain at least some of the user's data on the distributed ledger. The permissions granted to the service provider device 710 may be synchronized with the distributed ledger instances maintained by the service provider devices 310, 320 and the service provider nodes 312, 322. In aspects, synchronization of permissions for new service providers may be limited on a per ecosystem basis such that only distributed ledger data maintained by other service providers within a same service provider ecosystem as the new service provider are updated with the new service provider's permissions. In an additional or alternative aspect, the permissions may be synchronized between portions of the distributed ledger across multiple ecosystems or all ecosystems (e.g., in order to facilitate more robust data synchronization or system awareness).

In some aspects, the UAP device 120 may select one service provider to act as a custodian service provider. The custodian service provider 708 may facilitate, at least in part, synchronization of user data and permissions across or within ecosystems. For example, the UAP device 120 may select one of the service providers 710, 310, 320 as a custodian service provider responsible for backing up the user's data across ecosystems. Custodian service providers may not have write permissions (e.g., the custodian service providers cannot autonomously write new user data to the distributed ledger). Because of their role in assisting with synchronization of user data on the distributed ledger, custodian service providers may also be involved in facilitating backups of user data recorded on the distributed ledger to user wallets. It is noted that in some aspects service providers that are not custodians may be selected to aid in synchronization of distributed ledger data within or across ecosystems. In still other aspects, custodian service providers may be given precedence with respect to assisting with synchronization of data across and within ecosystems. For example, where multiple service providers within an ecosystem maintain user data on the distributed ledger and one of the service providers is a custodian service provider, the custodian service provider may assume or be assigned the role of managing or coordinating synchronization of distributed ledger data for one or more ecosystems.

As an illustrative example of the concepts illustrated in FIG. 7, suppose that the user of the user device 110 is a woman that is 26 weeks pregnant. The user may have already had many visits with her regular doctors but one night she experiences complications and needs to visit the emergency room in the middle of the night. While her regular doctors have access to various medical history data related to the user's pregnancy and other medical information, this is the first time the user has been to the emergency room. Traditionally, the user would be asked to complete a lot of paperwork and wait in a waiting room until it is time to see the doctor and once she is with the doctor, she would be asked a lot of questions about her medical history and pregnancy (e.g., information her regular doctors already have). The process is very time consuming and may create unnecessary and unreasonable delays with respect to providing services to users, and may lead to inaccurate information being given to the emergency room doctor (e.g., if the patient forgets to mention something about an existing condition). In contrast to the traditional handling of this exemplary scenario, upon arriving at the emergency room the user may register with the emergency room, as described above. Once the registration is complete and the user's metadata and permissions are transmitted to the emergency room system, the user's medical history information, including information about past tests and evaluations of the user during her pregnancy, may be shared (e.g., via synchronization with other medical service providers) with the emergency room system. In addition to sharing the medical history information, the metadata and permissions may also result in synchronization of the user's health insurance information, thereby eliminating the need to provide that information (or perhaps just confirming it is still correct) via filling out lengthy forms upon arrival at the emergency room.

The synchronization of the data upon approving the emergency room to the user's network of approved or authorized entities may enable the user to be seen by a doctor more quickly, minimize the time required with the doctor to diagnose the user (e.g., by eliminating the need to ask the user many questions to obtain the user's medical history), and minimize the costs of the health care services the user receives from the emergency room (e.g., by avoiding unnecessary tests due to having a more complete picture of the user's medical history). To illustrate, the doctor at the emergency room may be able to quickly review the synchronized medical history data to learn about the history of the pregnancy and then only ask questions about the current symptoms that the user is experiencing. This may enable the doctor to more rapidly diagnose the user's symptoms and implement a plan to treat the user's condition. For example, the doctor may determine that the user requires a minor medical procedure. It is noted that while the doctor may have arrived at the same diagnosis using traditional techniques, the synchronization and sharing of data may enable the services provided by the doctor and the emergency room to be provided more quickly and efficiently, thereby reducing the costs and time. Further, in some emergency situations the ability to synchronize and share data may play an even more critical role in providing services to users, such as if the user was suffering from a life threatening condition that could be more quickly diagnosed and treated due to synchronization of medical data instead of using traditional techniques.

As shown above, platforms of embodiments provides various advantages over present technologies and systems that allow users to exchange data with service providers. For example, presently users duplicate and manage their personal and other data inconsistently across service providers, resulting in inconsistent data being provided to the different service providers (e.g., different service providers may have different addresses or other information for the user) and/or different service providers have an inconsistent view of the user's information (e.g., different medical service providers may have limited visibility of the user information. In contrast, the platform 100 synchronizes user data across a variety of service providers and service provider ecosystems based on user-configurable permissions to ensure that user data is consistent across all service providers, at least to the extent that different service providers have the appropriate permissions for a given set of user data. Additionally, the platform 100 provides wallets (e.g., the wallet 117 of FIG. 1) that allows the user to view their online or data footprint (e.g., the data that the user has provided to different service providers). Moreover, the platforms of embodiments enable users to purge data from service providers, such as when the user stops using a service. It is noted that the use of distributed ledger technology (e.g., the distributed ledger 600 of FIG. 6) also provides technical improvements to the way that data is managed, stored, and synchronized. For example, traditional blockchain technologies are not suitable for providing all of the features provided by platforms of the present disclosure because deletion or purging of data from blockchains would create the appearance of tampering and may prohibit validation of data (e.g., because some blockchain validation techniques require information from previous blocks that may not be available if those blocks were deleted). Moreover, maintaining transaction sequences on the distributed ledger on a per user/per data type manner, as described with reference to FIG. 6, allows data to by shared and synchronized differently for different service providers and service provider ecosystems, thereby providing capabilities to tune and control how user data is shared between different service providers.

Figure 8:
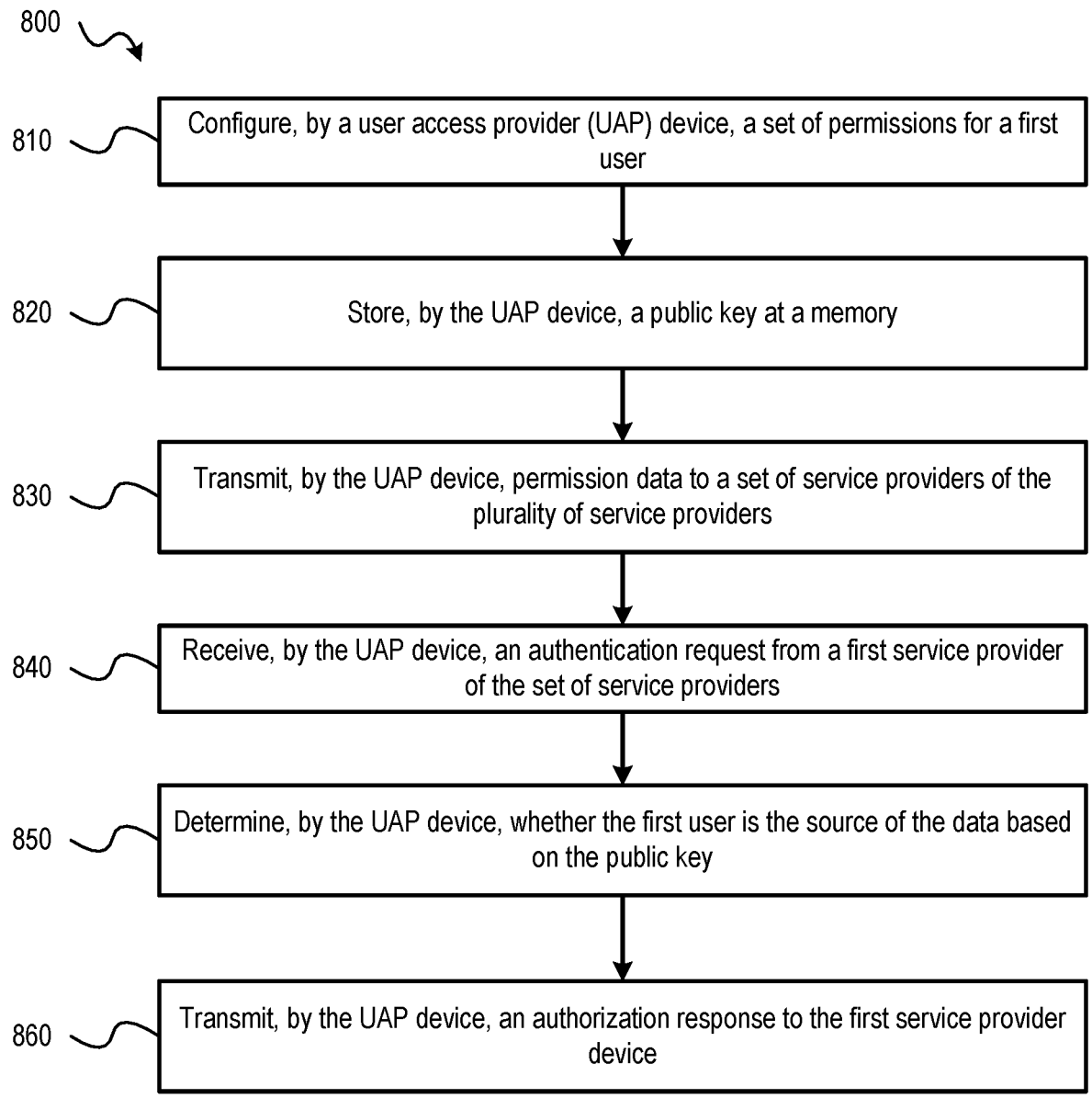
FIG. 8 is a flow diagram of an exemplary method for permission-based management of user data via a distributed ledger.

Referring to FIG. 8, a flow diagram of an exemplary method for permission-based management of user data via a distributed ledger is shown as a method 800. In aspects, the method 800 may facilitate operations of a data management platform, such as the platform 100 of FIG. 1. In aspects, the steps of the method may be stored as instructions that, when executed by one or more processors, cause the one or more processors to perform operations corresponding to the steps of the method 800.

As shown in FIG. 8, the method 800 may include, at step 810, configuring, by a user access provider (UAP) device, a set of permissions for a first user and at step 820, storing, by the UAP device, a public key at a memory. The set of permissions may be configured to grant or deny access to data of the first user by a plurality of service providers, such as the plurality of service providers illustrated in FIGS. 1-5 and 7. As described above, the set of permissions may be configured upon the user registering with the UAP device or at a subsequent time, such as when the first user starts using services provided by the plurality of service providers supported by the platform. As part of the registration process, the first user may be assigned a decentralized identity (PID), as described above with reference to FIG. 1. Additionally, the registration process may include creating a private/public key pair, where the private key is maintained or stored at a memory of a user device corresponding to the first user and the public key is stored at the memory of the UAP device (as in step 820 of the method 800).

At step 830, the method 800 includes transmitting, by the UAP device, the public key to one or more service provider nodes associated with service providers that provide services to the first user. As described above, as users provide data to services offered by service providers, the users may sign the data using the private key and the service providers may validate the users based on the public key, such as to verify that the first user is the source of data by using the public key corresponding to the first user to verify a signature included with data provided to a service. At step 840, the method 800 includes storing, by a first service provider node associated with a first service provider, first data to the distributed ledger. The first data may be provided to a service provided by the first service provider via the user device of the first user and may be validated by verifying a signature provided with the first data using the public key corresponding to the first user.

At step 850, the method 800 includes synchronizing, by the service provider node, the first data to one or more second service provider nodes based on a set of permissions corresponding to the first user. The one or more second service provider nodes may correspond to other service providers providing services to the first user and the set of permissions may specify different types of access for different ones of the one or more second service provider nodes, as described above. In aspects, user data recorded to the distributed ledger by the service provider nodes may be associated with states, as described above with reference to FIG. 3. For example, current data may be assigned a first state while data that has changed or been updated may be assigned a historic state. Additionally, data may be stored on the distributed ledger as a data transaction sequence, as described above with reference to FIG. 6, on a per-user and per-data type basis. In aspects, the method 800 may also include features for purging data from portions of the distributed ledger maintained by one or more service provider nodes, as described above with reference to FIG. 5, as well as synchronization of user data to wallets (e.g., to enable users to view a snapshot of their online data), and other features described herein.

As shown above, platforms of embodiments operating in accordance with the method 800 provide various advantages over present technologies and systems that allow users to exchange data with service providers. For example, the method 800 enables synchronization of user data across a variety of service providers and service provider ecosystems based on user-configurable permissions to ensure that user data is consistent across all service providers, at least to the extent that different service providers have the appropriate permissions for a given set of user data. Additionally, the method 800 enables synchronization of user data from the distributed ledger to user wallets (e.g., the wallet 117 of FIG. 1) to allows users to view their online or data footprint. Moreover, the method 800 may enable users to purge data from service providers, such as when the user stops using a service. It is noted that the use of distributed ledger technology (e.g., the distributed ledger 600 of FIG. 6) in the method 800 also provides technical advantages with respect to the way that data is managed, stored, and synchronized. For example, traditional blockchain technologies are not suitable for providing all of the features provided by method 800 because deletion or purging of data from blockchains would create the appearance of tampering and may prohibit validation of data (e.g., because some blockchain validation techniques require information from previous blocks that may not be available if those blocks were deleted). It is also noted that maintaining user data in transaction sequences on a per user/per data type manner, as described with reference to FIG. 6, allows data to be shared and synchronized differently for different service providers and service provider ecosystems, thereby providing capabilities to tune and control how user data is shared between different service providers and service provider ecosystems.

Figure 9:
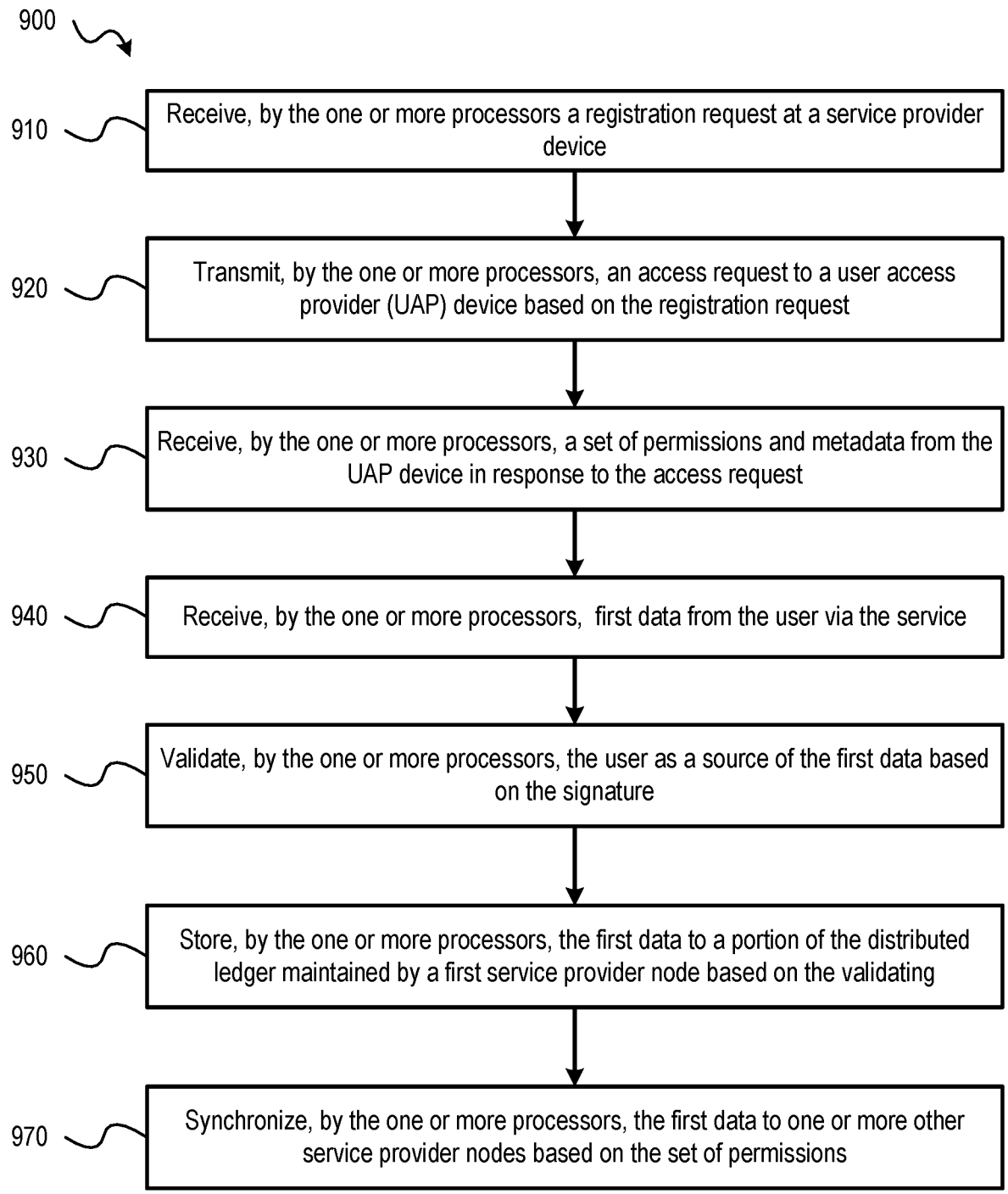
FIG. 9 is a flow diagram of another exemplary method for permission-based management of user data via a distributed ledger.

Referring to FIG. 9, a flow diagram of another exemplary method for permission-based management of user data via a distributed ledger is shown as a method 900. In aspects, the method 900 may be performed by a service provider system, such as the service provider devices and nodes illustrated in FIGS. 1-5 and 7. Steps of the method 900 may be stored as instructions that, when executed by one or more processors, cause the one or more processors to perform the steps of the method 900.

As shown in FIG. 9, the method 900 includes, at step, 910 receiving a registration request at a service provider device. The registration request may include information associated with a user registering for a service provided by a service provider corresponding to the service provider device, as described above with reference to FIG. 7. At step 920, the method 900 includes transmitting an access request to a user access provider (UAP) device based on the registration request and at step 930, receiving a set of permissions from the UAP device in response to the access request. The access request may be the access request 704 of FIG. 7 and the set of permissions may include the information described with respect to the permissions and metadata message 706 of FIG. 7. As described above, the set of permissions and metadata may authorize the service provider to store, access, and share data provided by the user depending on how the permissions are configured.

At step 940, the method 900 include receiving first data from the user via the service. As described above, the first data may include user data and a signature generated using the user's private key. At step 950, the method 900 includes validating the user as a source of the first data based on the signature. As described above, the signature may be validated by transmitting data to the UAP device (e.g., as described with reference to FIG. 3) or may be validated using the public key provided with the permission data (e.g., in step 930). At step 960, the method includes storing the first data to a portion of the distributed ledger maintained by a first service provider node. The first service provider node may be a service provider node corresponding to the service provider that received the first data and the portion of the distributed ledger may correspond to a data transaction sequence specific to the user, as described with reference to FIG. 6. At step 970, the method may include synchronizing the first data to one or more other service provider nodes based on the set of permissions. In aspects, the first data may be synchronized to the one or more other service provider nodes as described with reference to FIG. 4. It is noted that the method 900 may include other operations described herein, such as purging data, as described with reference to FIG. 5, synchronization of data to user wallet, and other features described herein.

As shown above, platforms of embodiments operating in accordance with the method 800 provide various advantages over present technologies and systems that allow users to exchange data with service providers. For example, the method 900 enables synchronization of user data across a variety of service providers and service provider ecosystems based on user-configurable permissions to ensure that user data is consistent across all service providers, at least to the extent that different service providers have the appropriate permissions for a given set of user data. Additionally, the method 900 enable synchronization of user data from the distributed ledger to user wallets (e.g., the wallet 117 of FIG. 1) to allows users to view their online or data footprint. Moreover, the method 900 may enable users to purge data from service providers, such as when the user stops using a service. It is noted that the use of distributed ledger technology (e.g., the distributed ledger 600 of FIG. 6) in the method 900 also provides technical advantages with respect to the way that data is managed, stored, and synchronized. For example, traditional blockchain technologies are not suitable for providing all of the features provided by method 900 because deletion or purging of data from blockchains would create the appearance of tampering and may prohibit validation of data (e.g., because some blockchain validation techniques require information from previous blocks that may not be available if those blocks were deleted). It is also noted that maintaining user data in transaction sequences on a per user/per data type manner, as described with reference to FIG. 6, allows data to by shared and synchronized differently for different service providers and service provider ecosystems, thereby providing capabilities to tune and control how user data is shared between different service providers and service provider ecosystems.

As shown above, embodiments of the present disclosure provide new techniques and processes for managing how user data is accessed, shared, and controlled in a multi-party environment. The permission-based controls provided by embodiments improve data security by preventing unauthorized entities from accessing user data (e.g., only service providers with access permissions authorized by the user can access the user data) and enable users to purge data from service provider systems (e.g., by revoking access permissions). Additionally, embodiments enable users to take control of their data in a variety of new ways, such as managing permissions on a per ecosystems basis (e.g., ecosystem-level permissions), on a per data type instance, on a per service provider basis, on a per data instance basis, and the like. Such capabilities provide users with robust controls for sharing data between different service providers while ensuring users data is maintained in a consistent state across all service providers having appropriate permissions. Moreover, embodiments provide wallets that enable users to view a snapshot of the data that service providers have, which may allow the users to make more informed decisions with respect to which service providers have access to their data and what data is included in their online footprint. The features and functionality described above may provide a framework that provides a standardized way for systems under the control of different service providers or entities to be operated autonomously while ensuring compliance with various requirements (e.g., GDPR) while allowing users to remain at the center of controlling how their data is accessed and used by third party entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-9) may comprise processors, electronics devices, hardware devices, electronics components, logical circuits, memories, software codes, firmware codes, etc., or any combination thereof. In addition, features discussed herein relating to FIGS. 1-9 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for permission-based management of user data via a distributed ledger, the method comprising:
   receiving, by a service provider device, a set of permissions from a user access provider (UAP) device, the set of permissions authorizing the service provider device to perform one or more actions with respect to data of a user;
   receiving, by the service provider device, first data from the user;
   storing, by the service provider device, the first data to a portion of a distributed ledger maintained by a service provider node, wherein the service provider node corresponds to the service provider device;
receiving, by the service provider device, revocation information from the UAP device,
wherein the revocation information indicates access the data of the user by the service provider device has been revoked; and
deleting, by the service provider device, at least a portion of the data of the user from the distributed ledger maintained by the service provider node based on the revocation information.

2. The method of claim 1, wherein the data of the user is not purged from portions of the distributed ledger maintained by other service providers of the set of service providers.

3. The method of claim 1, wherein the access to the data of the user by the service provider device is revoked for a first type of data, and wherein the service provider device is authorized to access portions of the data of the user associated with a second type of data that is different from the first type of data.

4. The method of claim 3, wherein the data of the user that is deleted from the distributed ledger maintained by the service provider node corresponds to the first type of data, and wherein other portions of the data of the user stored at the distributed ledger maintained by the service provider node are not deleted, the other portions of the data of the user corresponding to the second type of data.

5. The method of claim 1, wherein the set of permissions comprises permissions that control sharing of the data of the user with other service provider devices by the service provider device.

6. The method of claim 5, wherein the sharing of the data of the user is controlled by the permissions on a per data type basis.

7. The method of claim 1, further comprising:
storing, by the service provider device, second data associated with a second user to a second portion of the distributed ledger maintained by the service provider node,
wherein the second portion of the distributed ledger is distinct from the portion of the distributed ledger storing the data of the user.

8. A method for permission-based management of user data via a distributed ledger, the method comprising:
configuring, by a user access provider (UAP) device, a set of permissions for a user,
the set of permissions configured to grant or deny access to data of the user by a plurality of service providers;
distributing, by the UAP device, permission data to a set of service providers of the plurality of service providers,
the permission data comprising permissions authorizing the set of service providers to access data of the user,
wherein the set of service providers store and share the data of the user based on the permissions;
modifying, by the UAP device, the permission data associated with the set of service providers based on information received from the user,
wherein the modifying includes revoking access to the data of the user by at least one service provider of the set of service providers; and
transmitting, by the UAP device, revocation information to the at least one service provider that indicates the authorization to access the data of the user by the at least one service provider has been revoked,
wherein the at least one service provider deletes the data of the user from a portion of the distributed ledger maintained by at least one service provider node corresponding to the at least one service provider based on the revocation information.

9. The method of claim 8, wherein the data of the user is not purged from portions of the distributed ledger maintained by other service providers of the set of service providers.

10. The method of claim 8, wherein the access to the data of the user by the at least one service provider is revoked for a first type of data and wherein the at least one service provider is authorized to access portions of the data of the user associated with at least one other type of data.

11. The method of claim 10, the data of the user that is deleted from the portion of the distributed ledger maintained by the at least one service provider node corresponds to the first type of data, and wherein other portions of the distributed ledger maintained by the at least one service provider node corresponding to the at least one other type of data that is different from the first type of data are not deleted.

12. The method of claim 8, wherein the permission data comprises permissions for a plurality of different types of data and authorizes the set of service providers to access data of the user on a per data type basis.

13. The method of claim 8, wherein the permission data comprises permissions that control sharing of the data of the user by the set of service providers.

14. The method of claim 13, wherein the sharing of the data of the user is controlled by the permissions on a per data type basis.

15. A non-transitory computer-readable medium storing instructions that, when executed by one or more processors, cause the one or more processors to perform operations for permission-based management of user data via a distributed ledger, the operations comprising:
configuring a set of permissions for a user,
the set of permissions configured to grant or deny access to data of the user by a plurality of service providers;
distributing permission data to a set of service providers of the plurality of service providers,
the permission data comprising permissions authorizing the set of service providers to access data of the user,
wherein the set of service providers store and share the data of the user based on the permissions;
modifying the permission data associated with the set of service providers based on information received from the user,
wherein the modifying includes revoking access to the data of the user by at least one service provider of the set of service providers; and
transmitting revocation information to the at least one service provider that indicates the authorization to access the data of the user by the at least one service provider has been revoked,
wherein the at least one service provider deletes the data of the user from a portion of the distributed ledger maintained by at least one service provider node corresponding to the at least one service provider based on the revocation information.

16. The non-transitory computer-readable medium of claim 15, wherein the data of the user is not purged from portions of the distributed ledger maintained by other service providers of the set of service providers.

17. The non-transitory computer-readable medium of claim 15, wherein the access to the data of the user by the at least one service provider is revoked for a first type of data, and wherein the at least one service provider is authorized to access portions of the data of the user associated with at least one other type of data.

18. The non-transitory computer-readable medium of claim 17, the data of the user that is deleted from the portion of the distributed ledger maintained by the at least one service provider node corresponds to the first type of data, and wherein other portions of the distributed ledger maintained by the at least one service provider node corresponding to the at least one other type of data that is different from the first type of data are not deleted.

19. The non-transitory computer-readable medium of claim 15, wherein the permission data comprises permissions for a plurality of different types of data and authorizes the set of service providers to access data of the user on a per data type basis.

20. The non-transitory computer-readable medium of claim 15, wherein the permission data comprises permissions that control sharing of the data of the user by the set of service providers on a per data type basis.

* * * * *